United States Patent [19]
Pawlowski et al.

[11] Patent Number: 5,537,640
[45] Date of Patent: Jul. 16, 1996

[54] ASYNCHRONOUS MODULAR BUS ARCHITECTURE WITH CACHE CONSISTENCY

[75] Inventors: Stephen S. Pawlowski, Beaverton; Peter D. MacWilliams, Aloha; David M. Cowan, Gaston; Howard S. David, Beaverton, all of Oreg.

[73] Assignee: Intel Corporation, Santa Clara, Calif.

[21] Appl. No.: 257,952

[22] Filed: Jun. 10, 1994

Related U.S. Application Data

[63] Continuation of Ser. No. 724,898, Jul. 2, 1991, abandoned, which is a continuation-in-part of Ser. No. 292,476, Dec. 30, 1988, abandoned.

[51] Int. Cl.$^6$ .................................................. G06F 13/00
[52] U.S. Cl. .................... 395/473; 395/800; 395/285; 395/446; 395/451; 364/DIG. 1; 364/240.8; 364/243.44; 364/243.41; 364/243.4
[58] Field of Search ............................ 395/800, 285, 395/473, 446, 451

[56] References Cited

U.S. PATENT DOCUMENTS

| | | | |
|---|---|---|---|
| 4,480,307 | 10/1984 | Budde | 395/800 |
| 4,833,601 | 5/1989 | Barlow et al. | 395/425 |
| 5,043,886 | 8/1991 | Witek et al. | 395/425 |
| 5,119,485 | 6/1992 | Ledbetter, Jr. et al. | 395/425 |
| 5,185,878 | 2/1993 | Baror et al. | 395/425 |
| 5,228,134 | 7/1993 | MacWilliams | 395/425 |

FOREIGN PATENT DOCUMENTS 2035632  6/1980  United Kingdom .

OTHER PUBLICATIONS

"Enhancing MC68030 performance using the SN74ACT2155 cache", *Microprocessors and Microsystems*, Vol. 14 No. 10, pp. 653–663, (Dec. 1990).

Jeong et al. "AVSLI Chip for a Multiprocessor Workstation—Part II: A Memory Management Unit and Cache Controller" 1989, IEEE.

Edenfield et al. "The 68040 on–Chip Memory Subsystem" Feb. 1990, IEEE.

*Primary Examiner*—Alyssa H. Bowler
*Assistant Examiner*—L. Donoghue
*Attorney, Agent, or Firm*—Blakely, Sokoloff, Taylor & Zafman

[57] ABSTRACT

An asynchronous computer bus and method to maintain consistency of data contained in a cache and a memory which are each coupled to the bus. The bus comprises a cache hit indication means, a write access indication means, and a modified data indication means. A means is provided for invalidating a first portion of the cache, the invalidation means being operative upon activation of the cache hit indication means. Further, the bus comprises a modified data indication means and the write access indication means. A write-back means is provided for writing back the first portion of the cache data to the memory, the write back means being operative upon the first portion of the cache being invalidated by the invalidation means. Lastly, the bus comprises a shared data indication means which is operative on the cache hit indication means and upon failure of activation of the write access determination means.

11 Claims, 25 Drawing Sheets

Memory Configuration

Burst Read Cycle

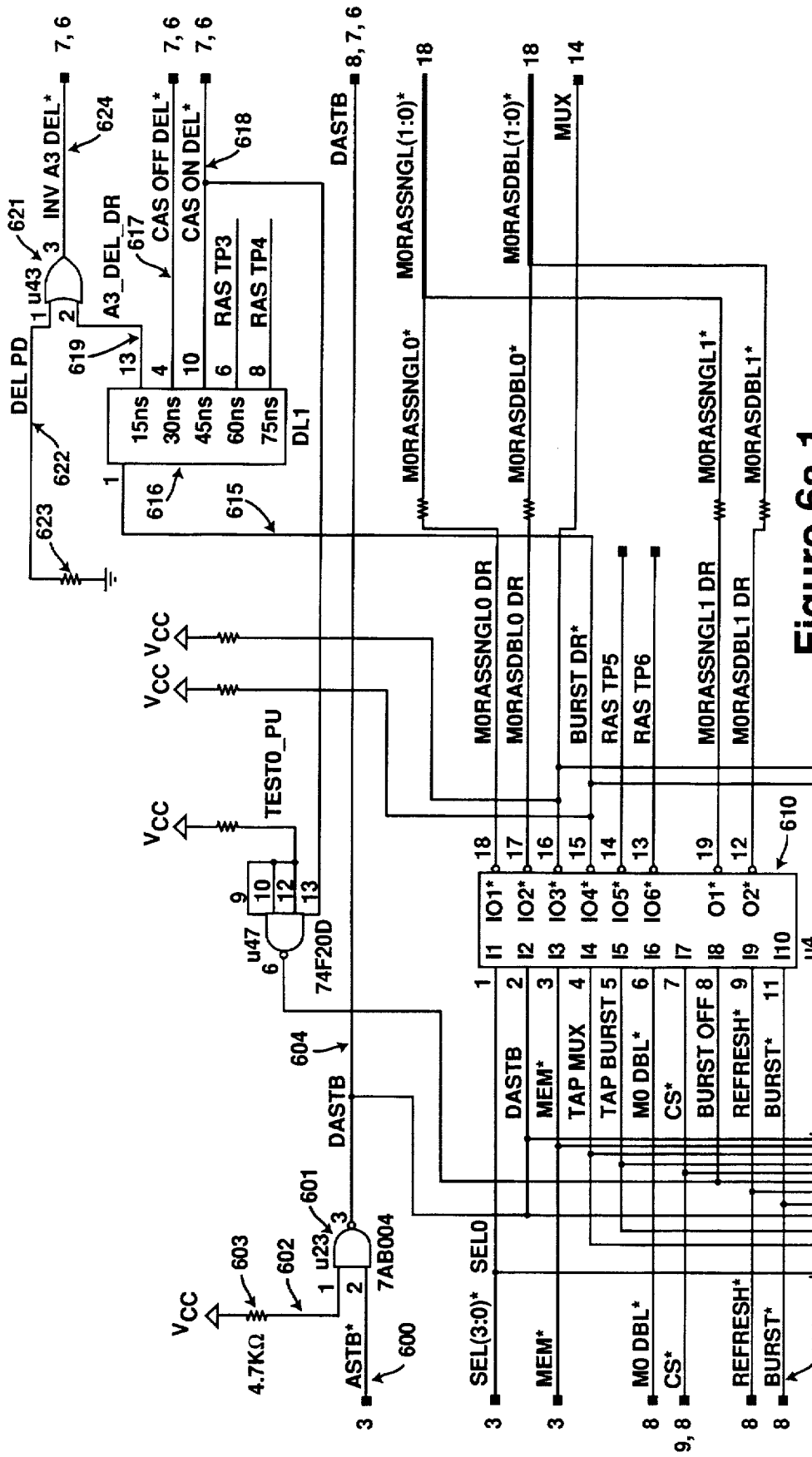
Figure 6a-1 RASGEN Circuitry

RASGEN Circuitry

RASGEN Circuitry

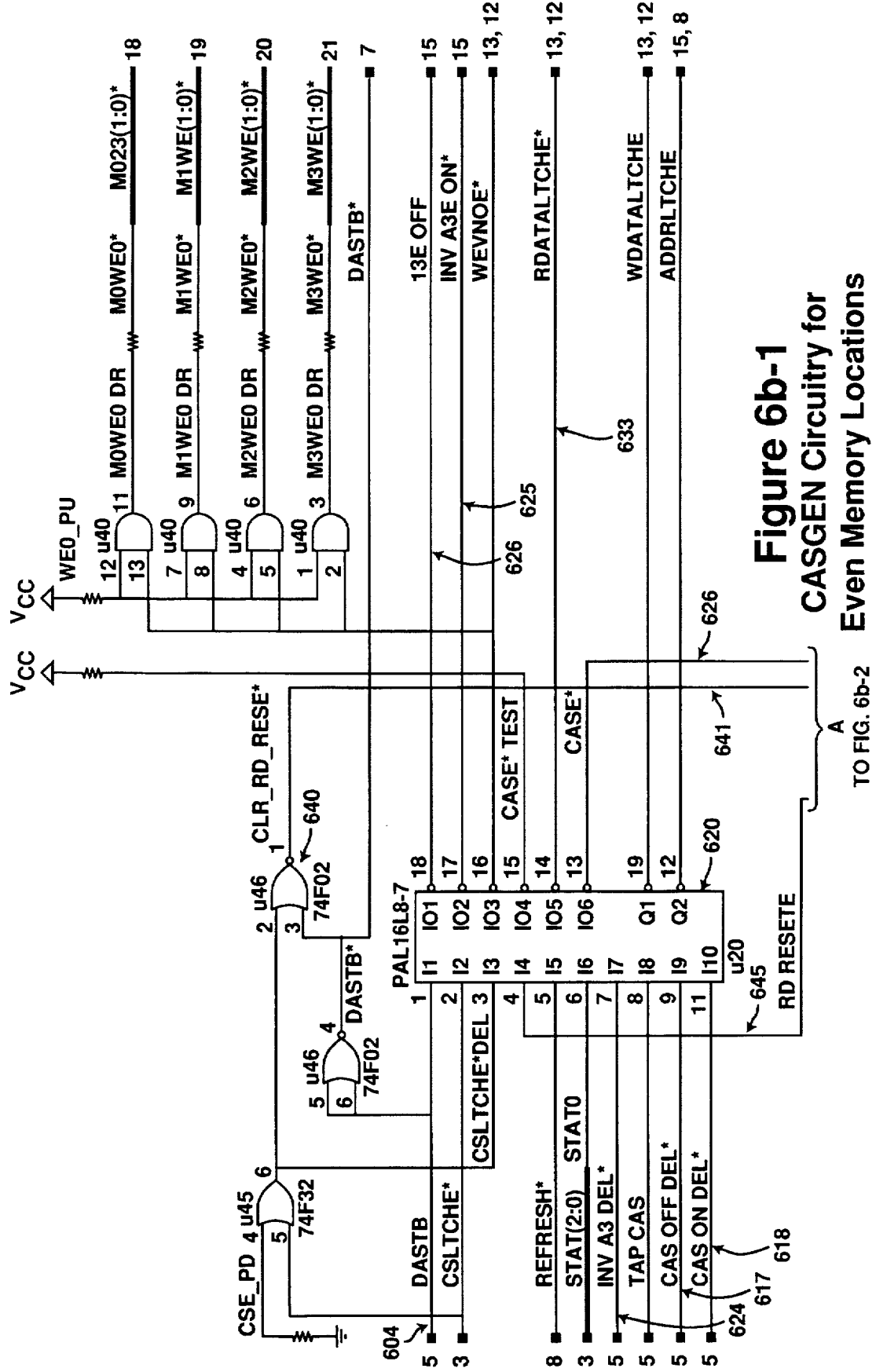
Figure 6b-1 CASGEN Circuitry for Even Memory Locations

CASGEN Circuitry for
Even Memory Locations

CASGEN Circuitry for Odd Memory Locations

CASGEN Circuitry for Odd Memory Locations

Data Transceiver Circuitry

Data Transceiver Circuitry

CPU Configuration

Deterministic Snoop Cycle

Invalidation-Only Asynchronous
Snoop Cycle to a Non-Modified
Cache Line (a Cache Miss)

Invalidation Snoop Cycle
Requiring Write-Back

CPU Module
Cache-Line Write-Back

ASYNCHRONOUS MODULAR BUS ARCHITECTURE WITH CACHE CONSISTENCY

CROSS-REFERENCE TO RELATED APPLICATIONS

This is a continuation of application Ser. No. 07/724,898, filed Jul. 2, 1991 now abandoned which is a continuation-in-part of Ser. No. 07/292,476, "Request/Response Protocol," filed on Dec.30, 1988, now abandoned, which is assigned to the assignee of the present invention.

BACKGROUND OF THE INVENTION

1. Field of the Invention

The present invention relates to the field of bus protocols in computer systems. More specifically, this invention relates to maintaining consistency of data residing in computer system cache(s).

2. Description of Related Art

Many known computer systems comprise a plurality of modules such as processor modules, memory modules, etc., which communicate over a system bus. Typically, the modules may be under control of a common or synchronized clock signal. Generally such a configuration provides a CPU clock signal on the bus. Individual modules generate signals on the bus synchronous to the CPU clock signal. A deterministic relationship is assumed to exist during the design of the various modules. Modules, such as the processing unit, may then be designed to add a fixed number of wait states to their access cycles to accommodate slower modules such a system design more than likely will require changes to the individual modules if the CPU clock speed is increased, for example. Therefore, it is difficult to replace one module in the computer system without affecting other modules.

Known computer systems further typically may utilize a plurality of configuration or "dip" switches. The switches are utilized to provide information to the processor unit regarding the configuration of installed modules. For example, a particular system may be configured with a first memory board having four megabytes of memory and a second memory board having an additional eight megabytes of memory. In this configuration, configuration switches, either on the main system board (motherboard or baseboard) or on the individual add-on modules may be set to indicate that four megabytes of memory are installed on the first memory board and eight megabytes of memory are installed on the second memory board.

In such systems, address decode logic may be employed on each memory board in the system. Based on the setting of the configuration switches in the examplary system described above, address decode logic may be employed such that the first board addresses memory in system memory space from memory address 0 to memory address 4 million (M)–1 and the second board addresses memory in the system memory space from memory address 4M to memory address 12M–1.

As an additional feature of modern bus architectures, a cache or multiple caches are used to increase throughput and performance between the central processing unit(s) and memory device(s). In order to employ cache(s) a cache-coherency or cache-consistency protocol must be used. This maintains the contents of memory consistent with the cache. Prior art approaches to maintaining cache consistency in a computer system have relied upon specific timing of central processing units and/or memories and the buses in a computer system. In other words, they have relied upon the synchronization of the synchronous bus architectures, and thereby have incurred the synchronization penalties associated with those architectures.

SUMMARY AND OBJECTS OF THE PRESENT INVENTION

One of the objects of the present invention is to provide an architecture wherein cache contents are maintained consistent with memory contents using an asynchronous bus architecture.

These and other objects of the present invention are provided for by an asynchronous computer bus which maintains consistency of data contained in a cache and a memory which are each coupled to the bus. The bus comprises a cache hit indication means, a write access indication means, and a modified data indication means. A means is provided for invalidating a first portion of the cache, the invalidation means being operative upon activation of the cache hit indication means. Further, the bus comprises a modified data indication means and the write access indication means. A write-back means is provided for writing back the first portion of the cache data to the memory, the write back means being operative upon the first portion of the cache being invalidated by the invalidation means. Lastly, the bus comprises a shared data indication means which is operative on the cache hit indication means and upon failure of activation of the write access determination means.

These and other objects of the present invention are provided for by a method of maintaining consistency between data contained in a cache and a main memory coupled to an asynchronous computer bus. The method comprises requesting access to a first location of memory. If the first location is currently in the cache then determining if the first location in the cache has not been modified, and if so, then determining if the access is a write and, if so, invalidating the first location in the cache and ending. Otherwise, indicating that the first location in the cache is in a shared state and ending. If the first location in the cache has been modified then writing back the first location in the cache data to the main memory. If the first location has been modified and the access is a write then invalidating the first location in the cache and ending. Otherwise, indicating that the first location in the cache is in a shared state and ending.

BRIEF DESCRIPTION OF THE DRAWINGS

The present invention is illustrated by way of example and not limitation in the figures of the accompanying in which like references indicate like elements and in which:

Note FIG. 6a includes its extensions FIGS. 6a-1, 6a-2 and 6a-3, FIG. 6b includes its extension FIG. 6b-1 and 6b-2. FIG. 6c includes its extension FIG. 6c-1 and 6c-2. FIG. 6d includes its extension FIG. 6d-1 and 6d-2. All references to these Figures in the specification refer to the figures extension(s).

DETAILED DESCRIPTION

Figure 1A:
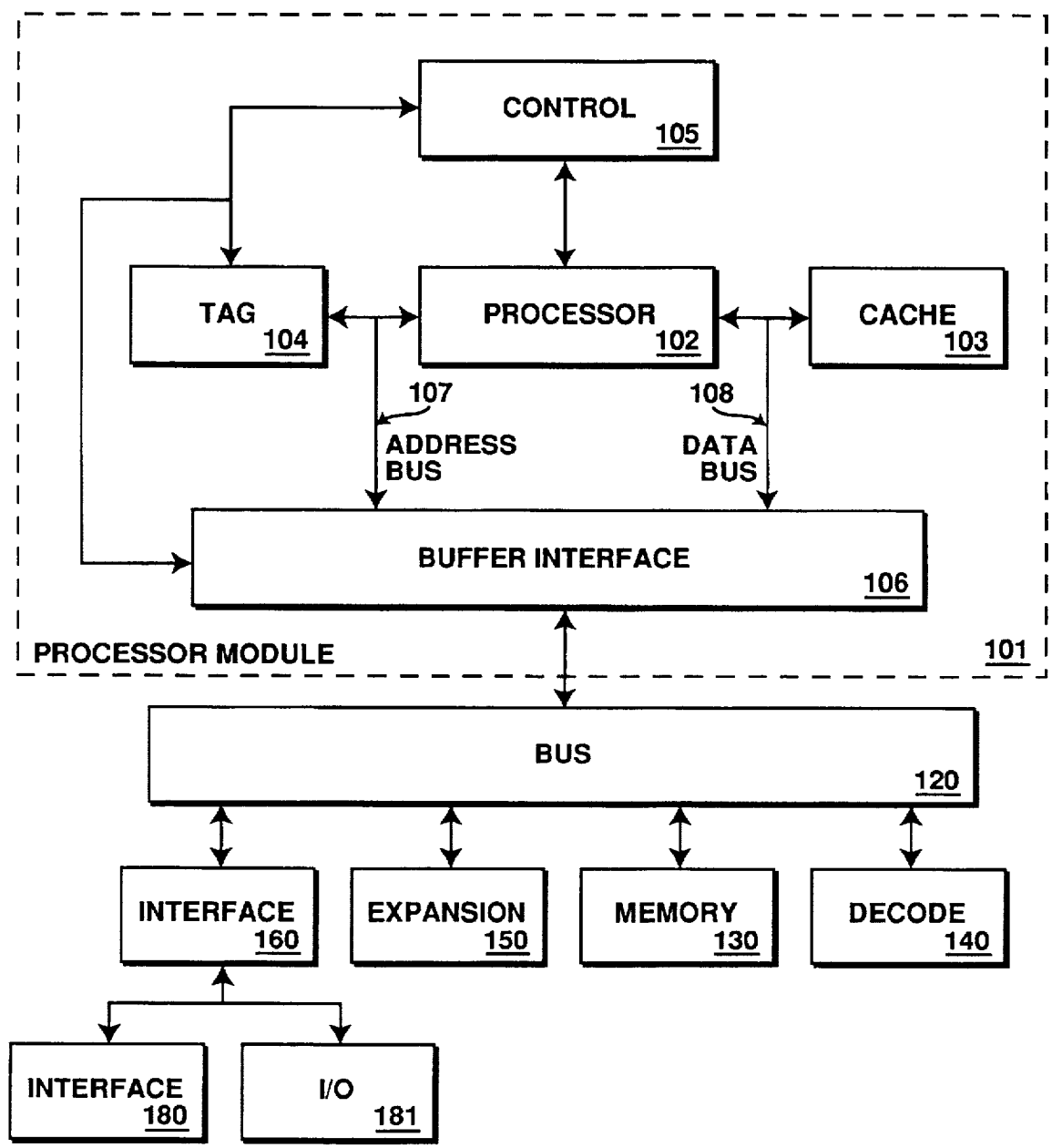
FIG. 1a is a block diagram illustrating a computer system as may be used by the preferred embodiment of the present invention.

A method and circuitry for consecutive transfers of data on an asynchronous bus is described. In the following description, numerous specific details are set forth such as signal names, etc., in order to provide a thorough understanding of the invention. It will be obvious, however, to one skilled in the art that the invention may be practiced without these specific details. In other instances, well-known circuits, structures and techniques have not been shown in detail in order to not unnecessarily obscure the invention.

COMPUTER SYSTEM OVERVIEW

General System Description

A method of "decoupling" the processor of a modern computer system from the other modules of the computer system is described. The processor's internal clock speed is independent of the clock speeds of other modules of the computer system.

It is known in modern computer system to allow modules, such as processors and memories, to operate asynchronously of each other. However, in such computer systems, a penalty is associated with any communication between the independent blocks. The "penalty" may be measured by the lost time or wait states imposed by synchronizing an incoming signal to a module with the clock speed of the module.

The preferred embodiment discloses operating the processor and other modules in an asynchronous mode to avoid the synchronization penalties of known computer systems, while allowing transfers to occur at the maximum rate of the central processing unit and/or memories. Also, the preferred embodiment provides for maintaining consistency of data residing in computer system cache(s).

Generally, the preferred embodiment discloses a processor (or other bus master) making a request to memory (or other resource such as I/O) over a bus. At the time the request is initiated by the processor, the processor assumes a deterministic transfer will take place (i.e., the processor knows the worst case time required to access a given memory). The processor waits on a response from the memory. The memory will respond to the request with information on its type, speed, mode of operation (deterministic and asynchronous) and the type of transfer cycle supported If the memory responds that it may be accessed in a deterministic manner, the processor waits the appropriate number of clock cycles (the number of clock cycles determined based on the speed information returned from the module) and reads data from the bus. If the memory responds that it cannot be accessed in a deterministic manner (i.e., it must be accessed asynchronously), the processor and memory communicate in an asynchronous manner with the inherent synchronization penalties.

The preferred embodiment supports a 32-bit bus architecture that complements the standard IBM compatible PC/AT, Microchannel Architecture (MCA), or EISA (Extended Industry System Architecture) interface. The bus is primarily used as a memory bus, however, it is capable of supporting multiple bus masters and I/O systems. This allows the present invention to be utilized in other embodiments having coprocessors requiring high bus bandwidth.

Block Diagram of the Preferred Embodiment

A block diagram of a computer system of the preferred embodiment is illustrated in FIG. 1a. A processor module 101 comprises a processor 102 having a cache memory 103 with its associated address tag buffer 104 and control circuitry 105. Processor 102 and address tag buffer 104 are coupled with buffer interface 106 through an address bus 107. Processor 102, along with the cache memory 103, is further coupled to buffer interface 106 through data bus 108. Processor module 101 is coupled to system bus 120 through buffer interface 106. Processor module 101 may access a memory, such as memory 130 over system bus 120. Processor module 101 may further access decode circuitry 140, expansion device circuitry 150, interface circuitry 160, thus accessing interface 180 for communication with other devices and/or I/O devices 181 over bus 120.

As will be described in more detail with reference to FIG. 2, memory of the preferred embodiment is configured (that is, memory modules will be assigned addresses in system memory address space) at the time the computer system is powered up. The preferred embodiment comprises an address decode module 140 coupled with system bus 120 for configuring system memory on power up. Each memory module in the system presents configuration information to the address decode module 140 at system power-up time and provides address decode for resource selection during normal run time.

A plurality of expansion slots, such as expansion slot 150, is coupled with system bus 120. Additional memory or other resources may be plugged into these expansion slots and may communicate with processor module 101 over system bus 120. I/O modules or other resources may be coupled to system bus 120 through interface 160 and are allowed to communicate with processor module 101 over system bus 120.

Figure 1B:
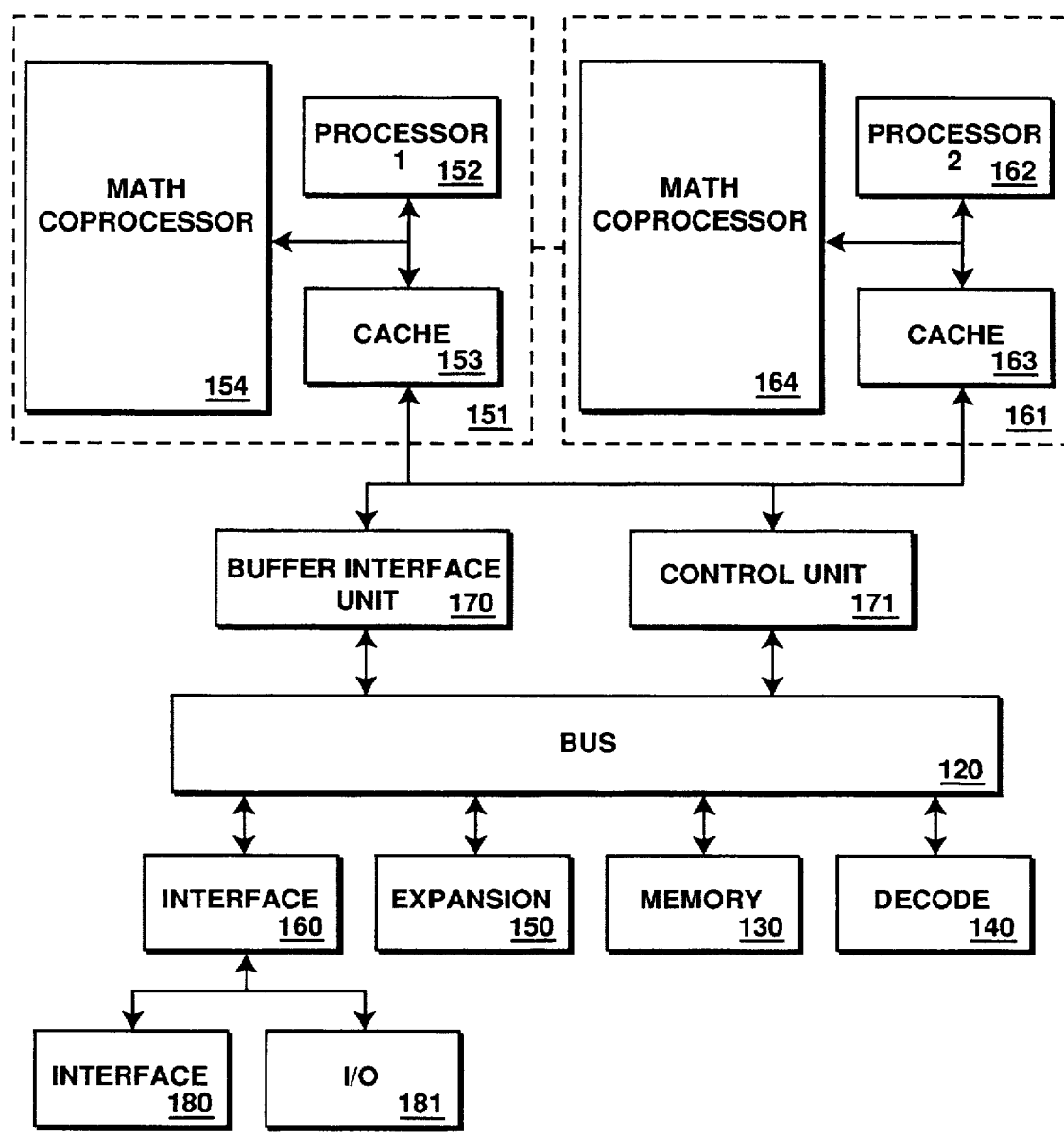
FIG. 1b is a block diagram illustrating a multiprocessing computing system as may be used by the preferred embodiment of the present invention.

In an alternative embodiment, as shown in FIG. 1b, multiple processor modules may be coupled to bus 120. As shown in FIG. 1b, multiple processing modules such as 151 and 161 may be coupled to a bus interface unit 170 and a control unit 171 is then coupled to bus 120. Each of the processing modules may be comprised of a processor, such as 152 or 162, and a math coprocessor such as 154 or 164. Lastly, each of the computing modules may comprise a cache area 153 or 163 which facilitates high speed transfers to and from bus 120.

Signal Naming Conventions

For the remainder of this application, signals will be generally referred to with signal names. It will be obvious that the particular signal names may be varied without departure from the scope and spirit of the present invention. Further, the notation used will normally refer to signal states as being active or inactive, as opposed to be high or low, one or zero, true or false, etc. Generally, in the description of the preferred embodiment, signals which are active when low are indicated with a trailing asterisk ("*"). It will be obvious to one of ordinary skill that the active state of signals may be reversed from that of the present invention without departure from the inventive aspects of the present invention. As examples of this signal naming convention, see Table I, below:

TABLE I

| SIGNAL NAME | ELECTRICAL NOTATION | LOGICAL NOTATION | STATE |
| --- | --- | --- | --- |
| RDY | High | 1 or true | Active |
|  | Low | 0 or false | Inactive |
| ASTB* | Low | 1 or true | Active |
|  | High | 0 or false | Inactive |

In describing signals, many signals are more easily or conventionally referred to as a group. Therefore, in describing groups of signals, signals may be referred to using a decimal radix convention, such as MD(31:0) referring to 32 data lines of a bus. Within each group, the least significant bit of the group is referred to with a suffix of "0", e.g., MD0 refers to the least significant data line of the bus and MD31 refers to the most significant data line.

Further, the preferred embodiment has a plurality of card slots for coupling cards to the system bus 120. In certain cases, signal names will have a lower case "n" following the signal name. In such cases, the "n" corresponds to one of the card slots. For example, SELn* refers to one of a plurality of signals, each of the plurality of signals associated with a card slot. SEL3* refers to a signal associated with card slot number 3. Certain signals used by the preferred embodiment will now be discussed.

Address Signal Group

This group of signals are address signals driven by a requestor at the beginning of an access.

MA(31:2) MA(31:2) refers to the 30 tri-state address lines on the address bus of the preferred embodiment. The address lines are not required to be latched by the processor and may not stay valid during the entire bus cycle.

MBE(3:0)* These lines refer to each of the four bytes of a 32-bit word addressed by the MA(31:2) signal lines. Together, the MBE(3:0)* and MA(31:2) comprise the 32-bit bus addressing mechanism of the present invention.

Data Signal Group

MD(31:0) Refers to the 32 tri-state data lines on the data bus of the preferred embodiment.

Request Signal Group

These signals are driven by the requestor when requesting and gaining access to the bus and by the arbiter when granting access to the bus.

REQ* The REQ* signal indicates that a processor is requesting use of the system bus. For example, if the processor requests use of the system bus, the processor will activate (bring low) signal REQ*. The processor continues to activate signal REQ* as long as the GRNT* signal remains active.

STAT(2:0) These three signals define the type of transfer that is being requested by the bus agent. Transfers can be either I/O or memory operations.

GRNT* Responsive to a REQ* signal being activated, or if REQ* is inactive and there are no other requests for bus resources, a central arbiter will grant use of the system bus to the requesting processor when all pending requests of higher priority have been serviced. The central arbiter activates the GRNT* signal to signal the requesting processor that it has been granted access to the system bus. After granting access to the bus to a requester, the central arbiter may remove access by inactivating the GRNT* signal only after the processor has activated the REQ* signal. The processor is allowed to complete the information exchange on the current bus cycle when GRNT* is inactivated, and will then deactivate its REQ* signal.

Response Signal Group

These signals are activated (or inactivated in the case of RDY) by a module responding to a request from a bus agent.

RESP(1:0) This group of signals is used to indicate the type of access mode a particular selected memory can support.

SPD(1:0) This group of signals defines the access speed of a particular selected memory device.

CCEN* When active, this line indicates that the particular memory access is cachable.

RDY This signal is normally high on the bus. It is pulled high during bus idle cycles. If a particular responding agent can respond in a deterministic mode, the agent will not drive the RDY signal and it will remain high (active) on the bus. If the responding agent will respond in an asynchronous mode, then the agent will drive the RDY signal inactive to initiate an asynchronous handshaking protocol.

WT/WB* Selects either a write-through or write-back replacement attribute.

WPROT* Indicates, if active, that this memory access is a write-through access.

Command Signal Group

These signals are used as commands to initiate and terminate accesses to the bus and to indicate a reset sequence.

ASTB* The ASTB* signal is the bus access strobe line indicating the beginning and end of bus events.

CSLTCHE*/CSLTCHO* The CSLTCHE*/CSLTCHO* signal is used by a requestor to initiate and terminate a fast page mode memory request for either even (CSLTCHE*) or odd (CSLTCHO*) memory locations. The ASTB* signal is held active to keep memory active and individual cycles are initiated and terminated by the CSLTCHE*/CSLTCHO* signal.

HRDRES This is the reset signal on the system bus used to indicate to modules in expansion slots the start of a reset sequence, such as at system power-up time.

Memory Bus Decode Signals

SELn* The SELn* line is generated by address decode logic and, when active, indicates to a selected resource which module is being accessed. Each partition (of which there are four per memory slot) has its own SELn* signal, the particular slot being indicated by the n.

MEM* General select term that takes into account the 640 kilobyte to one megabyte hole present in IBM PC/AT, MCA, or EISA architectures, and other accesses such as input/output requests compatible computer systems. It is used with SELn* by the memory resource to determine selection.

Cache Consistency Group

The following signals are defined for implementations that support caching protocols with write-through (WT) and write-back (WB) replacement mechanisms and maintain the consistency of data between the cache and the system memory.

FLUSH* The FLUSH* signal is used to indicate to a primary/secondary cache, if implementing a write-back replacement algorithm, to write back its modified data and then invalidate its TAG entries. A write-through cache will invalidate its TAG entries only.

SYNC* The SYNC* is used to indicate to the write-back cache to write back its modified entries. Contrary to FLUSH*, it does not invalidate the TAG entries. This signal is not used for a write-through cache implementation.

SSTB* The transition of the SSTB* signal indicates that valid "snoop" addresses are available on the interface and the CPU module should perform a snoop cycle. Snoops are discussed in more detail below.

SPRDY* The SPRDY* signal is used by CPU modules implementing the asynchronous snoop cycle protocol. When a snoop cycle is requested, the activation of SPRDY* will indicate that the snoop status is available from the CPU module.

MODIFIED* MODIFIED* is the snoop status signal available with respect to the activation of SPRDY*. When active, it indicates that the CPU module must perform a write-back cycle to memory. If inactive, the CPU module does not need to perform a write-back cycle.

Figure 2:
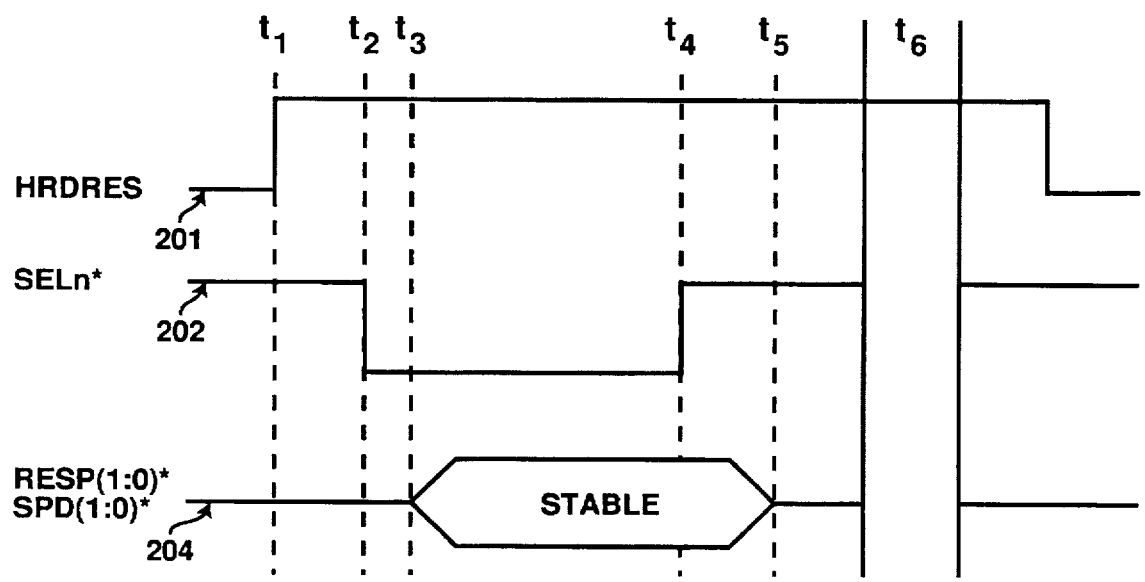
FIG. 2 is a timing diagram illustrating start-up memory identification signals.

Memory Size Identification—FIG. 2

Referring now to FIG. 2, the method used by the preferred embodiment for identifying memory size is described in detail. The preferred embodiment allows for boards in the computer system which contain memory space accessible to processors to identify the memory size which is available at the time the system is started up. It will be obvious to one of ordinary skill that memory size identification does not have to occur precisely at start-up time and that other system management functions may occur prior to memory size identification. Further, one of ordinary skill in the art can appreciate a system implementing the methods of the present which allows for reallocation of system memory after start-up of the computer system. For example, additional memory may be allocated as being accessible to the processors of the present invention after start-up.

Figures 2, 6A:
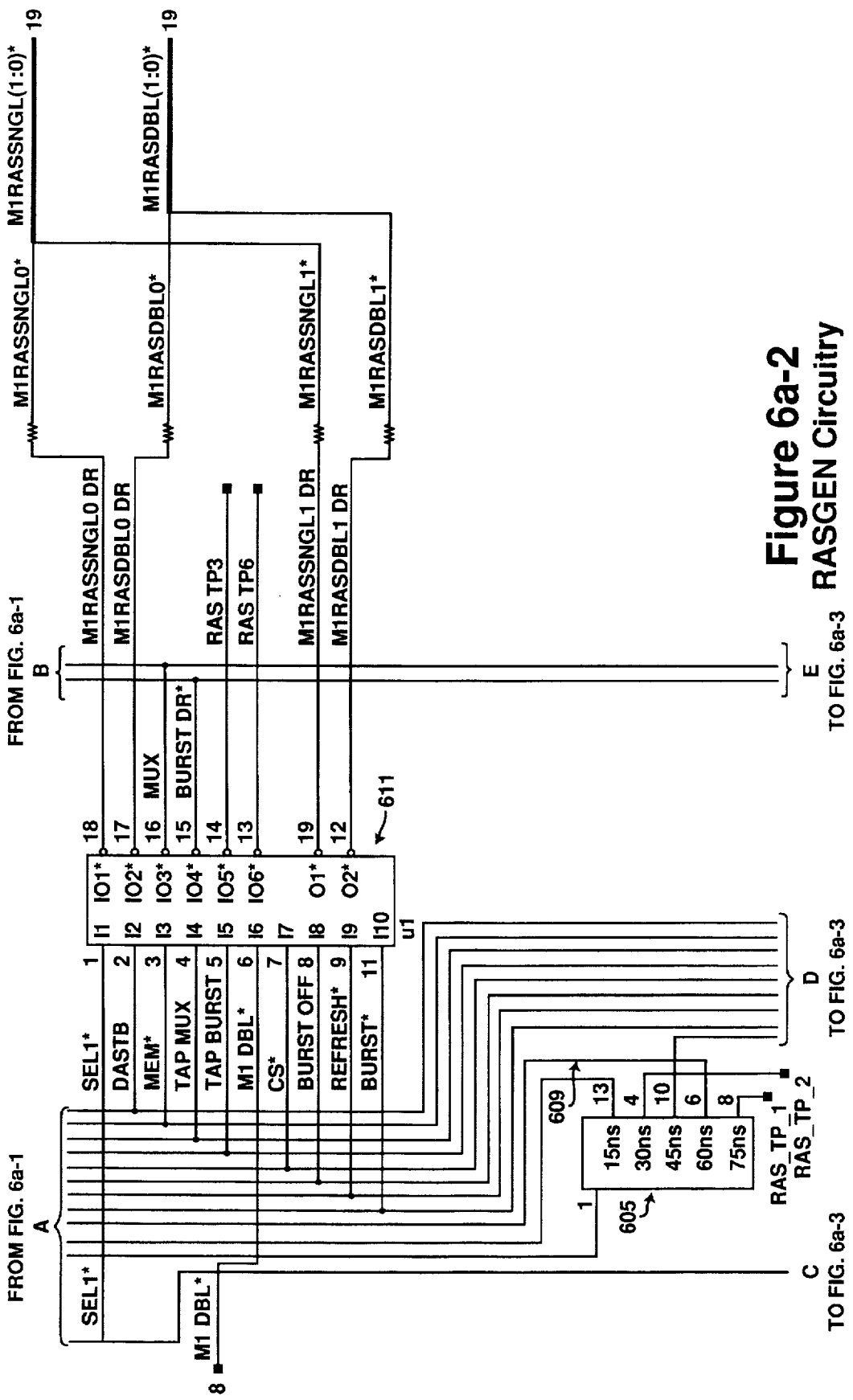
FIGS. 6a, 6b, 6c, and 6d show an architecture used in the preferred embodiment for responding to burst mode transfers on an asynchronous computer bus.
Figures 3, 6A:
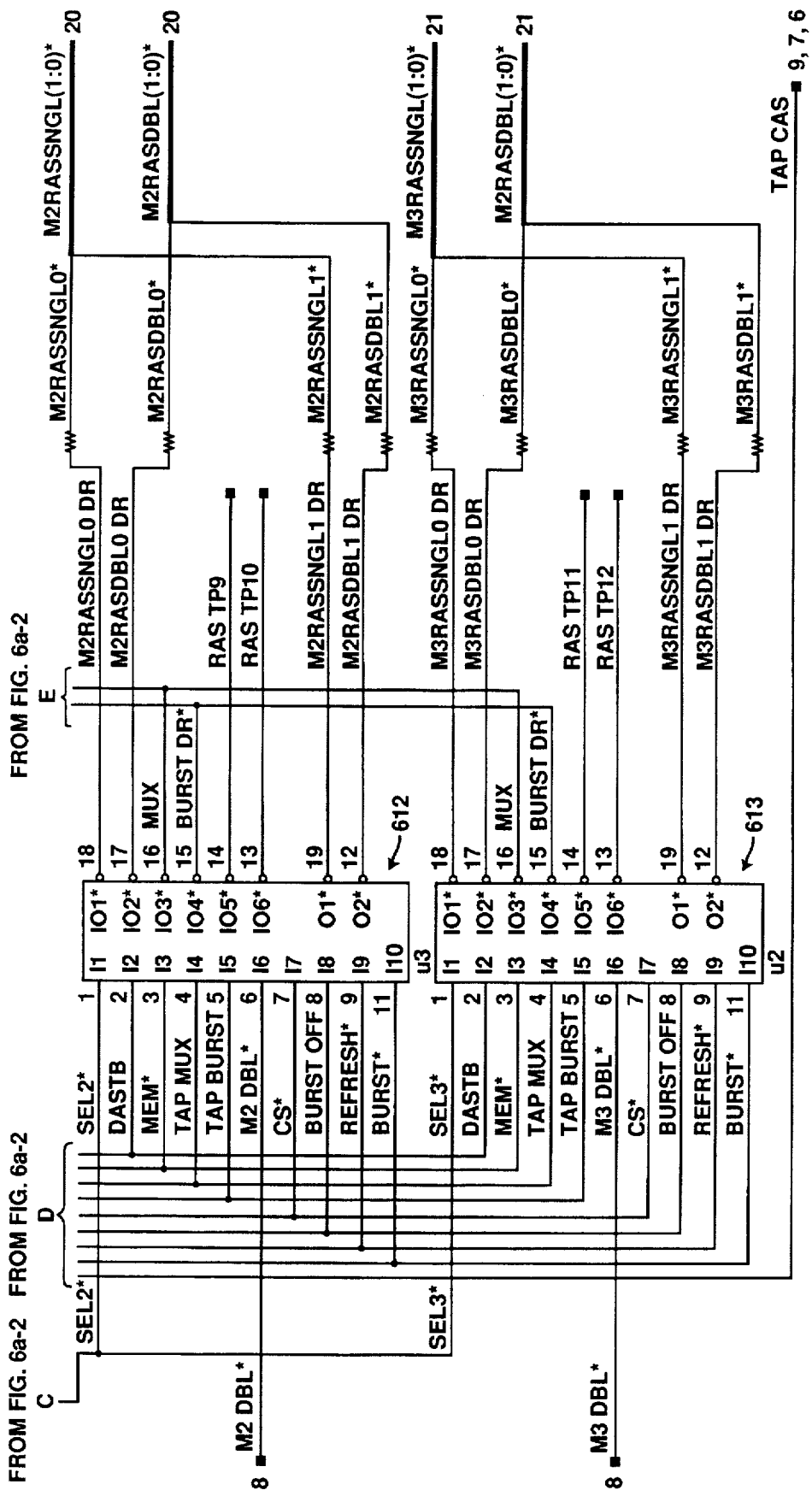
Figures 2, 6B:
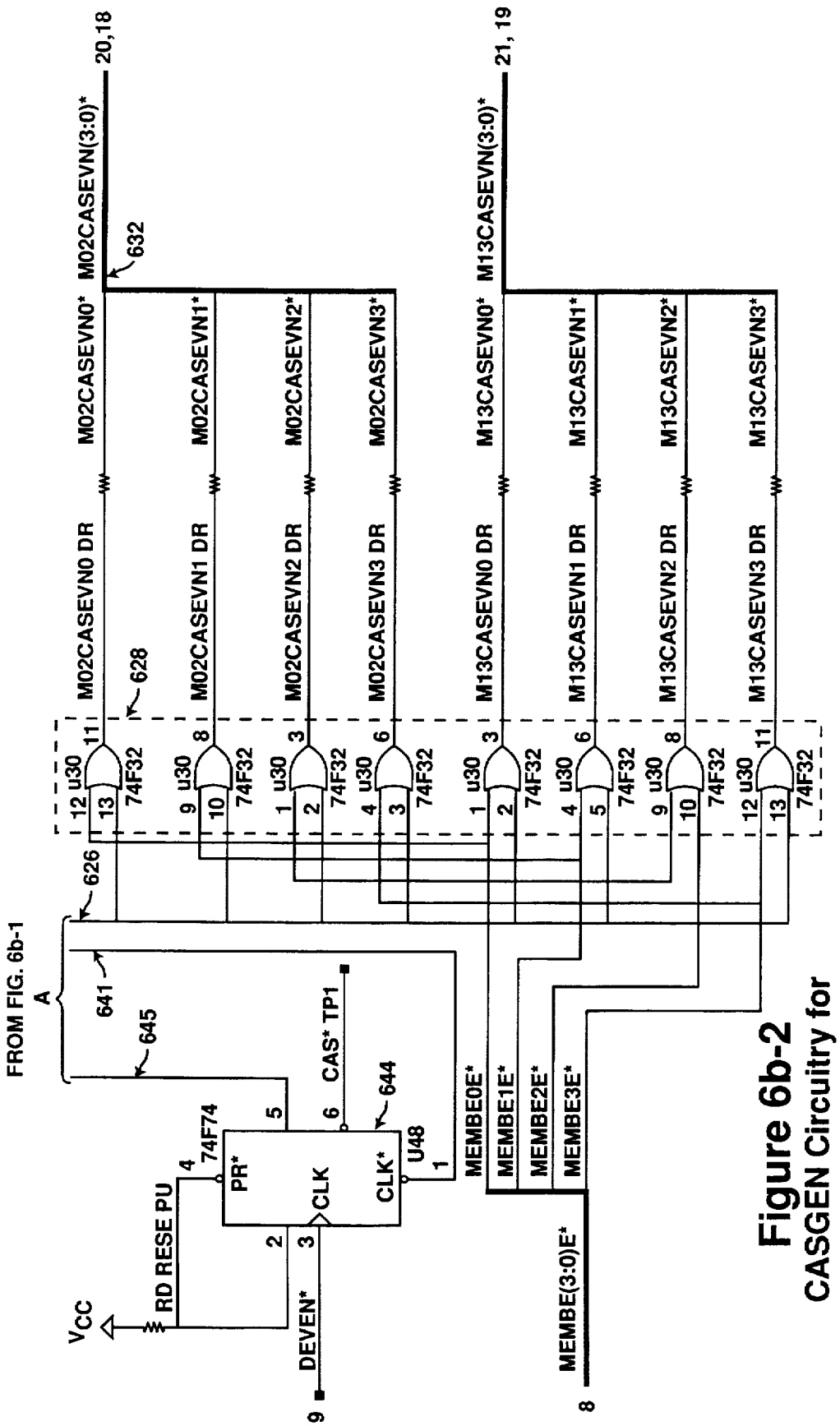
Figures 1, 6C:
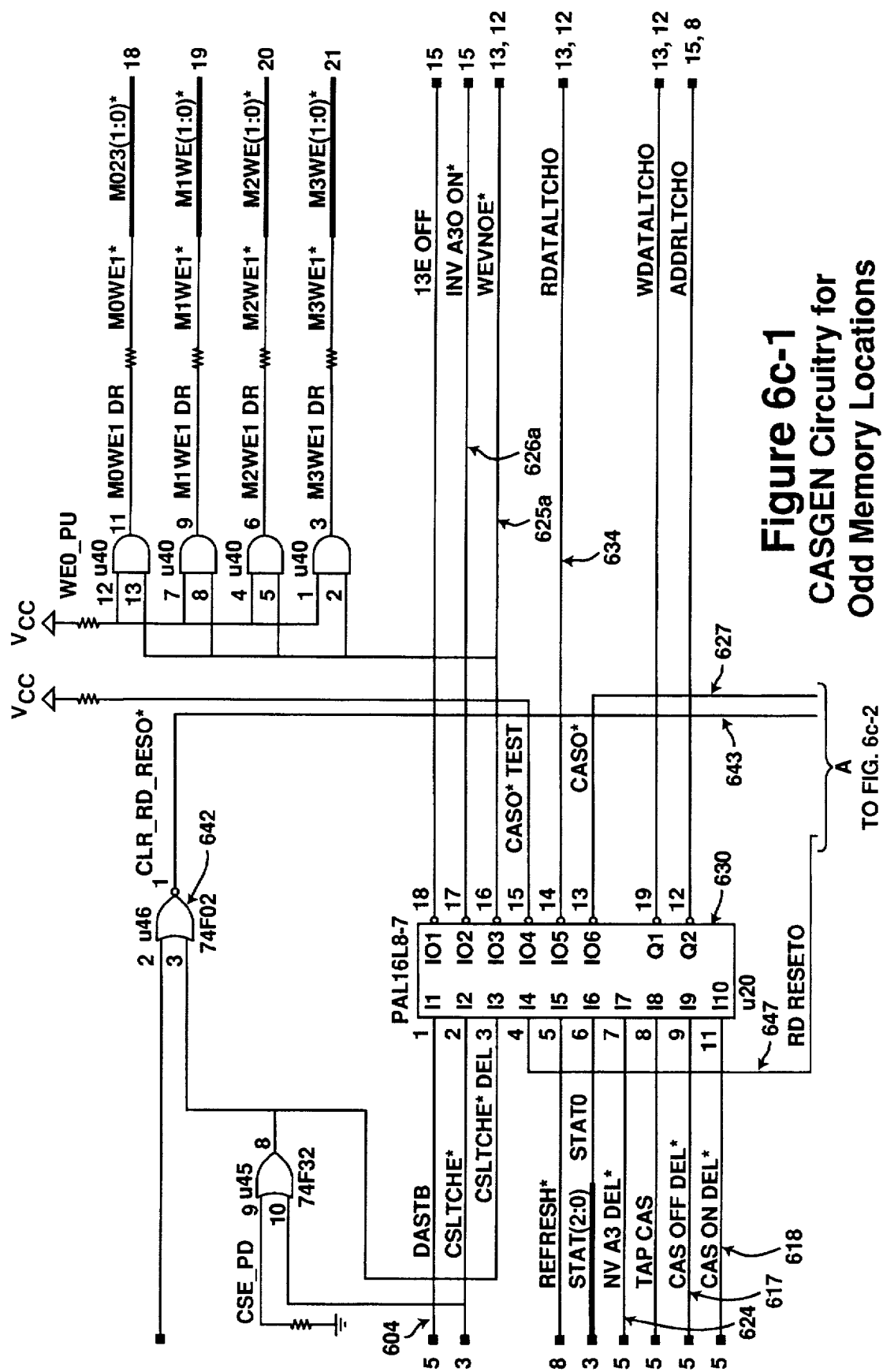
Figures 2, 6C:
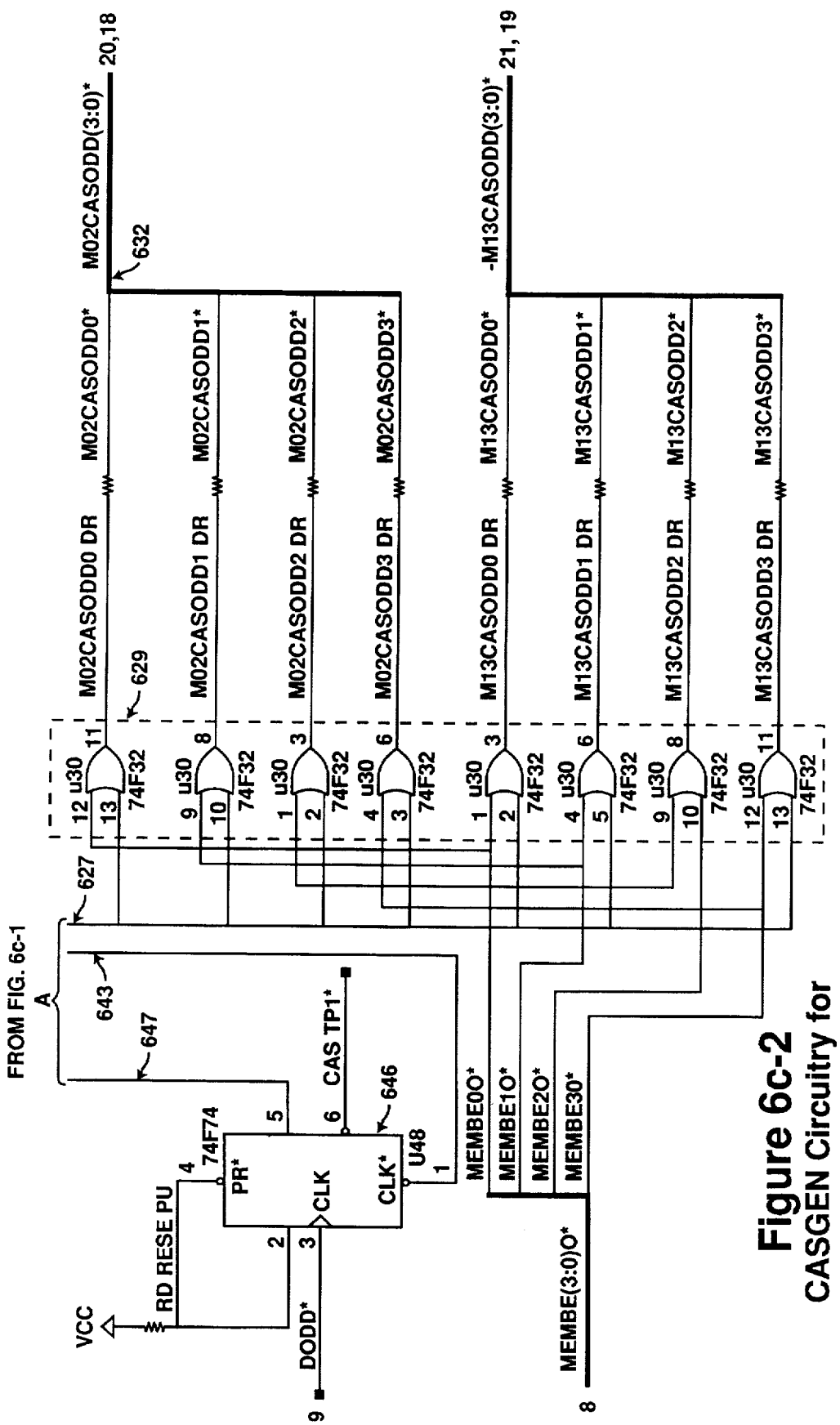

The present invention comprises a central address decode module, shown as decode module 140 in FIG. 1. Although the preferred embodiment teaches a separate module for implementing the decode function, one of ordinary skill can appreciate other means may be utilized, such as by using a general purpose processing unit for decoding the address signals and assigning system memory address space. The address decode module latches size information received from each partition of memory in the system. The address decode module then assigns system address space to each partition of memory in the system.

System address space from memory location 0 to (first memory partition size-1) is assigned to the first memory partition. System address space from memory location (first memory partition size) to memory location (second memory partition size-1) is assigned to the second memory partition. System address space from memory location (first memory partition size+second memory partition size) to memory location (first memory partition size+second memory partition size+third memory partition size-1) is assigned to the third memory partition. This pattern continues for assignment of system address space to each memory partition in the system.

In the preferred embodiment, as shown by FIG. 2, a state machine in the address decode circuitry of is activated by the HRDRES signal 201 being activated such as at the time the system is powered up or at other times during system operation when a system reset is required (time $t_1$). The state machine maintains the HRDRES signal active during the self-identification process. The state machine sets an internal address counter to zero. This counter is used for allocation of the memory address space for the various partitions. The state machine then drives the SELn* 202 signal active for slot 0 (time $t_2$). If there is a board in slot 0, it drives configuration signals RESP(1:0)*, SPD(1:0)* 204 to indicate the amount of memory available in the slot. In the preferred embodiment, the RESP(1:0)*, SPD(1:0)* 204 signals are communicated on the bus over signal lines used for other signals during non-reset periods. The memory size information communicated is understood with reference to Table II.

TABLE II

| RESP0* | SPD1* | SPD0* | MEMORY SIZE |
| --- | --- | --- | --- |
| H | H | H | 0 Megabytes |
| H | H | L | 2 Megabyte |
| H | L | H | 4 Megabytes |
| H | L | L | 8 Megabytes |
| L | H | H | 16 Megabytes |
| L | H | L | 32 Megabytes |
| L | L | H | 64 Megabytes |
| L | L | L | 128 Megabytes |

As can be seen with reference to Tables II, in the case of a module not being present in a slot, or if the module has no system memory available, status information is returned indicating no memory (0 megabytes) is available.

In the case of the second embodiment, the SELn* signal is utilized to select a partition for providing memory configuration information. As will be seen with reference to FIG. 2, the HRDRES signal 201 is activated at time $t_1$. Responsive to the HRDRES signal being activated, the decode module begins polling each of the slots for memory configuration information by driving the appropriate SELn* signal 202. For example, the decode module first drives the SELn* signal 202 to select slot 0 at time $t_2$. The module at slot 0 then drives configuration information onto the RESP(1:0)*, SPD(1:0)* lines 204 at time $t_3$ and maintains valid information on these lines until the decode module inactivates the SELn* signal 202 at time $t_4$. The module at slot 0 then stops driving valid information at time $t_5$. If the first partition in the first memory resource responds with a memory configuration of greater than 0 megabytes, the decode module increments the internal counter and assigns system address space to the module as described above. This cycle is repeated for each slot by the decode module driving the appropriate SELn* signal 202 and the memory at the corresponding partition responding by driving RESP(1:0)* and SPD(1:0)* signals 204 during time $t_6$.

The state machine disables its control of the HRDRES signal 201 after completion of this cycle for the last memory partition.

The address decode module identities, during subsequent in formation exchanges between modules in the system, the appropriate memory module corresponding to a given address. This protocol allows elimination of configuration switches on the motherboard of the system for configuring memory on individual memory modules. Further, address decode logic is centrally located in address decode module 140. This eliminates the need for address decode circuitry on each of the individual memory modules.

Bus Arbitration Cycle

The present invention discloses three arbitration cycles for arbitrating access to the system bus by a requestor. In general, the processor asserts its REQ* signal. A central arbiter also receives a separate request for the I/O bus arbiter for potential requests in the system. The central arbiter evaluates requests and grants ownership of the bus as described in connection with FIGS. 3a and 3b. The three arbitration cycles will be referred to as: (1) normal arbitration. (2) exchange protocol and (3) preemption protocol.

Figure 3A:
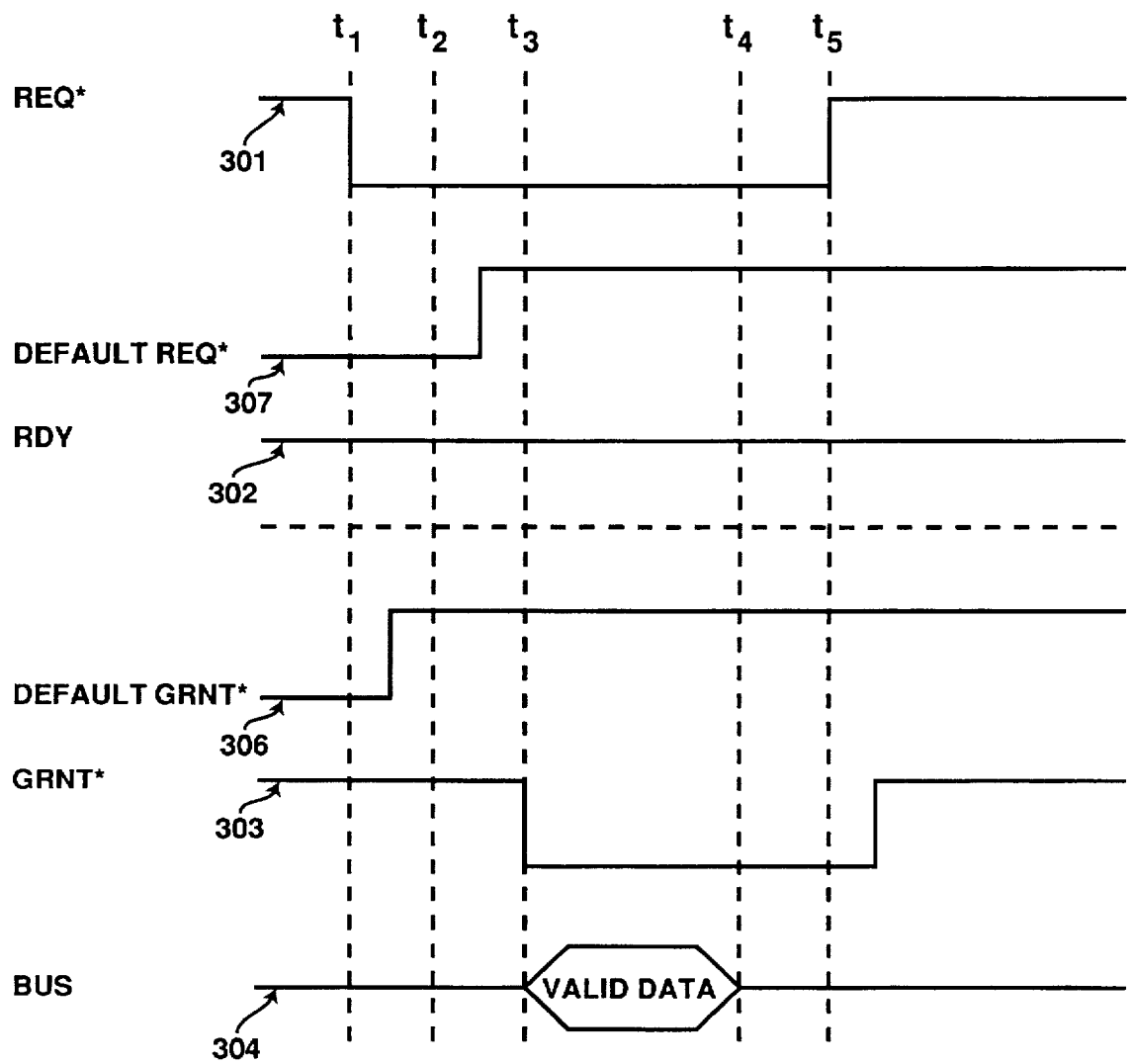
FIG. 3a is a timing diagram illustrating a arbitration protocol.

Normal Arbitration—FIG. 3a

Referring first to FIG. 3a, the normal bus arbitration protocol is illustrated. In normal arbitration, a default bus owner, the processor in the preferred embodiment, has control of the bus. A secondary bus master (requestor) drives its REQ* signal 301 active at time $t_1$. Responsive to the secondary bus master driving its REQ* signal 301 active, the central arbiter requests the bus from the default bus owner by inactivating the default GRNT* signal 306. The processor senses the default GRNT* signal 306 being driven inactive and completes any outstanding transfer operations. The processor then inactivates its default REQ* signal 307 indicating it has relinquished the interface. The processor may again assert its REQ* signal 307 after a minimum period of REQ* 307 being inactive to again request access to the interface. After default GRNT* signal 306 is driven inactive after time $t_1$, and the default REQ* signal 307 is inactivated, and at time $t_3$, GRNT* 303 is driven active indicating that the module has obtained ownership of the bus. Then, valid data may be driven onto bus 304 until time $t_4$. The transfer ends with REQ* 301 being driven inactive at time $t_5$, and GRNT* 303 being released thereafter.

Figure 3B:
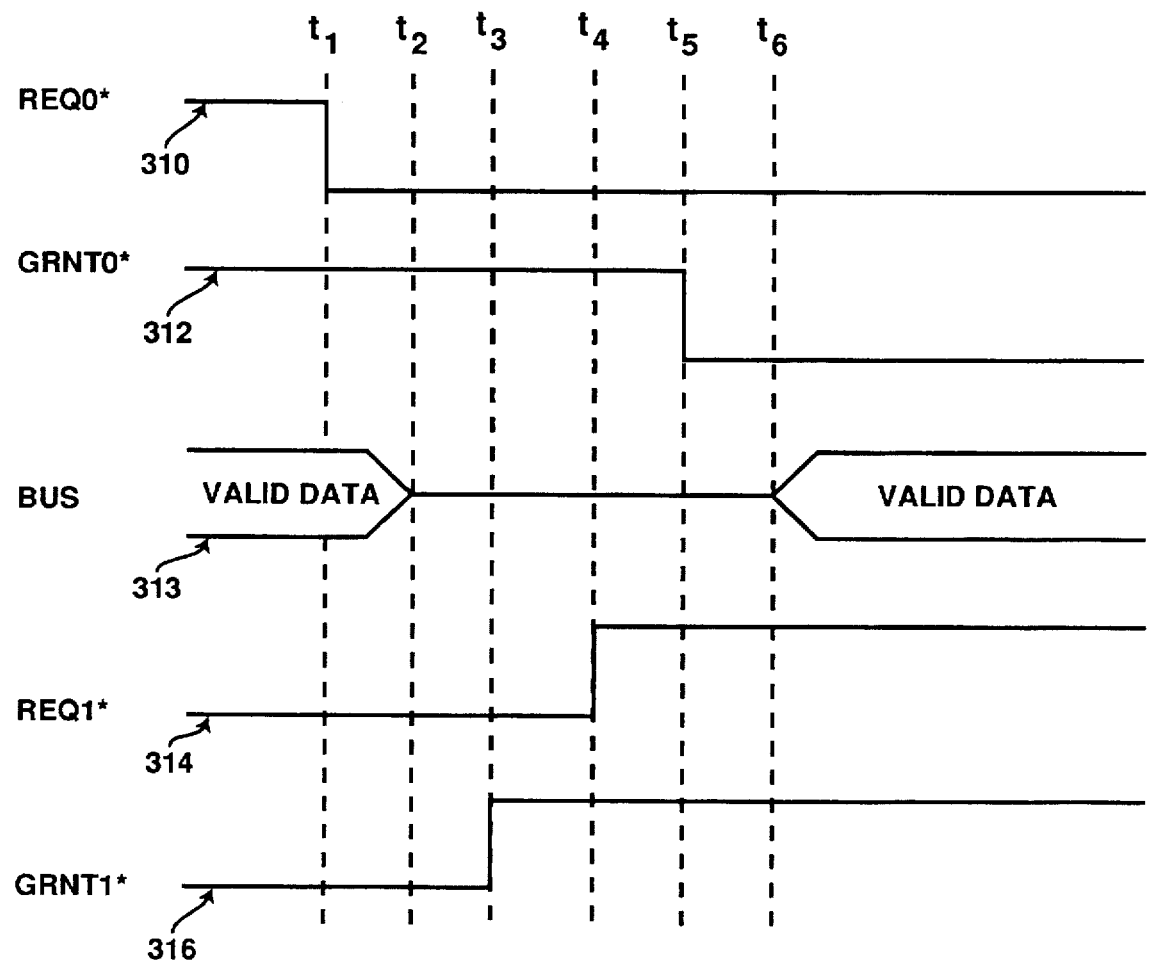
FIG. 3b is a timing diagram illustrating a bus master exchange protocol used in the preferred embodiment.

Exchange Protocol—FIG. 3b

Referring to FIG. 3b, the bus exchange protocol is illustrated. The bus exchange protocol allows exchange of control of the bus from one coprocessor to another. In the illustration of FIG. 3b, coprocessor 1 has control of the bus at time $t_1$ (the central arbiter is asserting the GRNT1* signal 316 inactive, granting coprocessor 1 access to the bus). Coprocessor 0, which is lower priority than coprocessor 1, requests access to the bus by activating its REQ0* signal 310 at time $t_1$. Coprocessor 0 will continue to assert its REQ0* signal 310 until it is granted control of the bus. However, GRNT1* will be deasserted sometime after $t_1$ to request coprocessor 1 to relinquish the bus. Coprocessor 1 is allowed to complete its current information exchange on the bus (valid data continues to be transmitted on the bus 313 during time interval $t_1$ through $t_2$) and then surrenders the interface.

Coprocessor 1 completes its information exchange at time $t_2$. The central arbiter deactivates the GRNT1* signal 316 at time $t_3$ and the CPU module then inactivates the REQ1* signal 314 at time $t_4$, indicating to the central arbiter it has given up control of the bus. The GRNT0* signal 312 is activated at time $t_5$ granting coprocessor 0 access to the bus. Coprocessor 0 begins its information exchange on the bus 313 at time $t_6$.

Request/Response Protocol

The preferred embodiment uses a request/response protocol which allows memory devices to identify their access mode, (RESP(1:0)*), whether the memory device is cachable (CCEN*), the speed of the memory device (SPD(1:0)*) and whether the device may be accessed deterministically or asynchronously (RDY). The page size is defined to be four kilobytes.

Specifically, the preferred embodiment of the present invention allows three access modes: (1) standard RAS/CAS mode, (2) fast paged mode, and (3) burst mode. The memory device identifies the mode it is capable of operating in by activating or inactivating the appropriate RESP(1:0)* group signals, as shown with reference to Table III, below:

TABLE III

| RESP1* | RESP0* | ACCESS MODE |
|---|---|---|
| Active | Active | Fast Memory Cycle (ASTB*/CSLTCHE*/CSLTCHO* initiated/terminated) (128 bit resource data width) |
| Active | Inactive | Reserved |
| Inactive | Active | Fast Memory Cycle (64 Bit Resource)[1] |
| Inactive | Inactive | Standard Access (ASTB* initiated/Terminated) (32 Bit Resosource)[2] |

[1]This is a potentially a BURST/paged 64 bit access (64 bit wide memory resource).
[2]This is a non-BURST/non-paged memory access.

Standard RAS/CAS mode is used for I/O and other bus accesses as well as standard memory accesses. Fast paged mode is performed in which the row addresses are latched by the memory device and column addresses flow through, however, the CAS addresses do not flow through but instead are latched on each successive access by the active going edge of the CAS. Burst mode allows data (128 bits) to be "bursted" to the processor at a high speed with consecutive cycles transferring data.

The CCEN* signal is interpreted with reference to Table IV. A memory access is considered to be cachable when the coherency of data in memory and cache can be enforced.

TABLE IV

| CCEN* | CACHABLE |
|---|---|
| L | The memory access is cachable |
| H | The memory access is not cachable |

SPD(1:0)* signal is interpreted with reference to Table V. SPD(1:0)* is interpreted with the RESP(1:0)* signals during ASTB* or CSLTCHE* and CSLTCHO* initiated deterministic read cycles. The speed indicates how fast DWORD's will be available during read accesses. The speed in the preferred embodiment is defined in terms of the RAS (row address strobe) access time.

TALBE V

| | | DWORD ACCESS TIME (nS)⁺⁺ (Responding Agent) | |
|---|---|---|---|
| | RESP(1:0)* | SPD(1:0)* | First/Second | Third/Fourth |
| ASTB* Initiated | 11 | 11 | 107 nS | — |
| | 11 | X0 | — | — |
| | 11 | 0X | — | — |
| | 01 | XX | Reserved | Reserved |
| | 10 | 11 | 107 nS | 185 nS |

TALBE V-continued

| | RESP(1:0)* | SPD(1:0)* | DWORD ACCESS TIME (nS)++ (Responding Agent) | |
|---|---|---|---|---|
| | | | First/ Second | Third/ Fourth |
| | 10 | X0 | — | — |
| | 10 | 0X | — | — |
| | 00 | 11 | 107 nS | 107 nS |
| | 00 | X0 | — | — |
| | 00 | 0X | — | — |
| CSLTCHE*/ | 11 | 11 | 47 nS | — |
| CSLTCHO* | 11 | X0 | — | — |
| Initiated | 11 | 0X | — | — |
| | 01 | XX | Reserved | Reserved |
| | 10 | 11 | 47 nS | 123 nS |
| | 10 | X0 | — | — |
| | 10 | 0X | — | — |
| | 00 | 11 | 47 nS | 47 nS |
| | 00 | X0 | — | — |
| | 00 | 0X | — | — |

Legend
0 - Low Voltage Level
1 - High Voltage Level
XX - Don't Care
— Undefined
++Access values listed are with reference to the activating strobe. They assume all other access parameters (i.e. address access time, CAS precharge access time, etc.) have been met or exceeded.

The WT/WB* signal indicates the type of replacement mechanism that will be implemented for an accessed entry should it be cachable. It allows the replacement algorithm for the cached entry to be defined on a line by line basis. This signal is also used during CPU module configuration time to define whether the CPU module can support deterministic snoop cycles or asynchronous snoop cycles.

The WPROT* signal indicates whether the current access is to non-writable memory. If active, a write access to that memory location will not occur. If inactive, write cycles will update memory).

When a processor makes a request, it identifies the type of request using a set of request lines STAT(2:0). The STAT(2:0) lines define the type of access currently on the bus and are coded, in the preferred embodiment, as defined by Table VI.

TABLE VI

| STAT2 | STAT1 | STAT0 | TYPE |
|---|---|---|---|
| L | L | L | Reserved |
| L | L | H | Reserved |
| L | H | L | I/O Read |
| L | H | H | I/O Write |
| H | L | L | Burst Mode Read Cycle |
| H | L | H | Reserved |
| H | H | L | Memory Read |
| H | H | H | Memory Write |

Generally, when a requestor makes a request for access to a memory device, the responding memory device will respond within a predetermined period of time to the request with information identifying the above characteristics. If the memory device responds that it is able to operate in a deterministic manner, the requesting coprocessor waits a determinate period of time and then pulls data off of the bus. If the memory responds that it must operate in an asynchronous manner, the requesting processor accesses the memory device asynchronously encountering the synchronization penalties associated with the required handshaking.

Figure 4A:
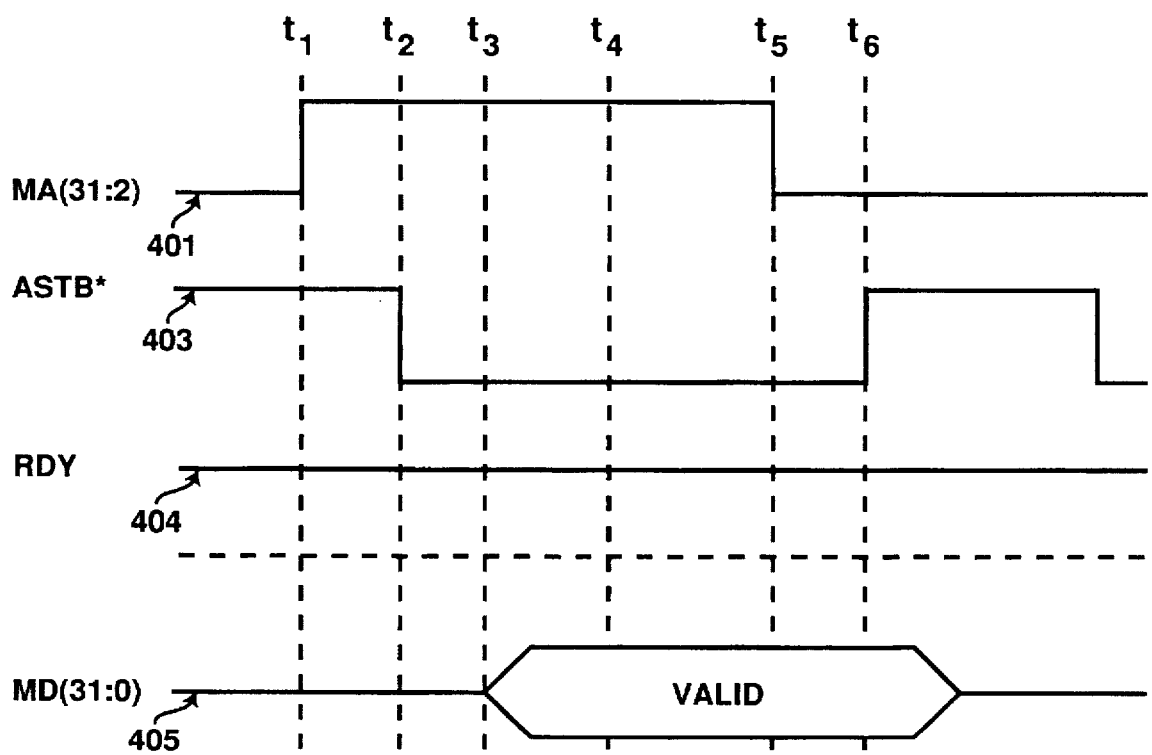
FIG. 4a is a timing diagram illustrating a deterministic read cycle.

Deterministic Read Cycle—FIG. 4a

Referring first to FIG. 4a, after a processor has been granted control of the bus as described in connection with FIGS. 3a and 3b, the processor drives an address 401 onto the bus at time $t_1$. The processor also drives (at time $t_1$) the appropriate request signals (not shown), as illustrated by Table VI.

After setting up the MA(31:2) signals 401, the processor activates the ASTB* signal 403 at time $t_2$. ASTB* signal 403 indicates the beginning of a bus event.

If RDY signal 404 is active, a deterministic access is assumed. RDY signal 404 is normally in the active state and, therefore, a deterministic device does not need to drive this signal. For a deterministic access, the bus slave (memory module) asserts the appropriate response group signals. Based on the access mode and speed as defined above, the processor determines an appropriate number of wait states to delay before accessing data on the bus. In this manner (i.e., making a request and receiving a response-request/response protocol), the processor is able to customize accesses to memory based on the particular type and speed of memory being accessed. Further, this customization of memory may be accomplished without any requirement of user settable switches.

The deterministic period is calculated in the preferred embodiment based upon the access time required for the memory to respond to a given request. The deterministic period varies depending on the mode of memory operation and the speed of the memory device. Generally, the deterministic period may be calculated as follows:

$$T_{def} + Taccess + T_{data\ setup} + T_{bus\ loss\ (round\ trip)} = T_{Deterministic}$$

Where:

$T_{def}$=The amount of time from the processor reference to the ASTB* signal being active on the bus (usually with reference to a clock, e.g., ASTB* will be switched based on the processor clock; however, there is a delay from the clock to the ASTB* signal changing state. $T_{del}$ includes this delay);

Taccess=The period of time from ASTB* being active on the bus to valid data being on the bus (for example, in a 80 nS memory as may be utilized by the preferred embodiment, this period is 120 nS);

$T_{data\ setup}$=The data setup period of the processor;

$T_{bus\ loss\ (round\ trip)}$=The propagation delay for a signal driven from point A to point B plus the delay for a return signal to travel from point B back to point A: and $T_{Deterministic}$=The deterministic memory access time for a standard RAS/CAS device.

After providing control information via the CCEN*, SPD(1:0)*, and RESP(1:0)* signals, the data bus MD(31:0) 405 may be driven with valid data by a bus slave. The processor waits a deterministic amount of time (time $t_3$ through $t_4$, determined based on the speed and type of the memory) and then may access data on the bus. Data on the bus is assumed to be valid for deterministic transfers after the deterministic period of time.

After reading the data from the bus, the processor releases the address lines MA(31:2) 401. The processor then inactivates the ASTB* signal 403 at time $t_6$. When the bus slave detects the ASTB* signal 403 going inactive, it may release the data lines MD(31:0) 405.

This protocol is repeated for any further reads required from the memory by the processor.

Figure 4B:
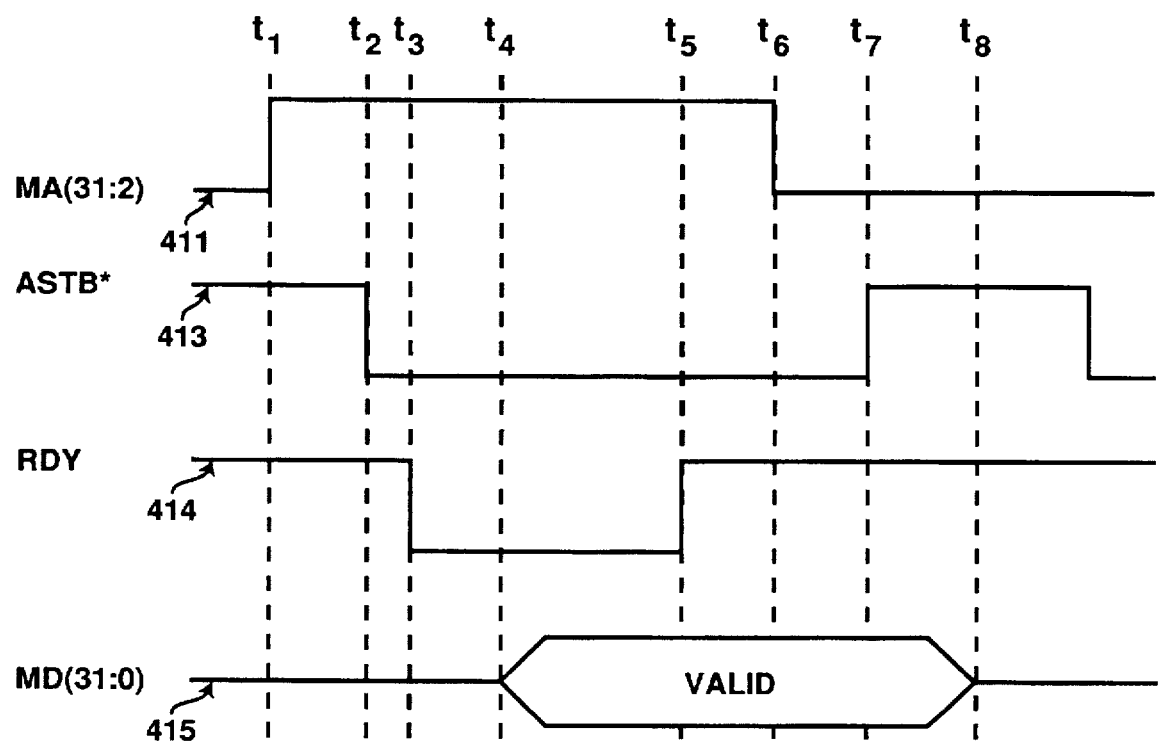
FIG. 4b is a timing diagram illustrating an asynchronous read cycle.

Asynchronous Read Cycle—FIG. 4b

Referring to FIG. 4b, the protocol for an asynchronous read is illustrated. In an asynchronous read, a processor which has been granted control of the bus drives address signals MA(31:2) 411 onto the bus at time $t_1$. The processor then activates the ASTB* signal 413 at time $t_2$.

The selected bus slave (e.g. memory) deactivates the RDY signal 414 at time $t_3$ to indicate that the read will be asynchronous. Responsive to ASTB* signal 413 being driven active, the selected device begins to drive data on the the data bus MD(31:0) 415 at time $t_4$. When valid data is available, the bus slave drives the RDY signal 414 active at time $t_5$. The bus master may then read data from the bus. After sensing the RDY signal 414 being driven active, the bus master discontinues asserting its the MA(31:2) address signals 411 at time $t_6$ and deactivates ASTB* signal 413 at time $t_7$.

The bus slave detects the ASTB* signal 413 being driven inactive and discontinues asserting data signals 415 at time $t_8$. The RDY signal 414 is active and will remain active throughout the bus idle state.

The bus master may request transfer of more data by repeating the above-described protocol.

Figure 4C:
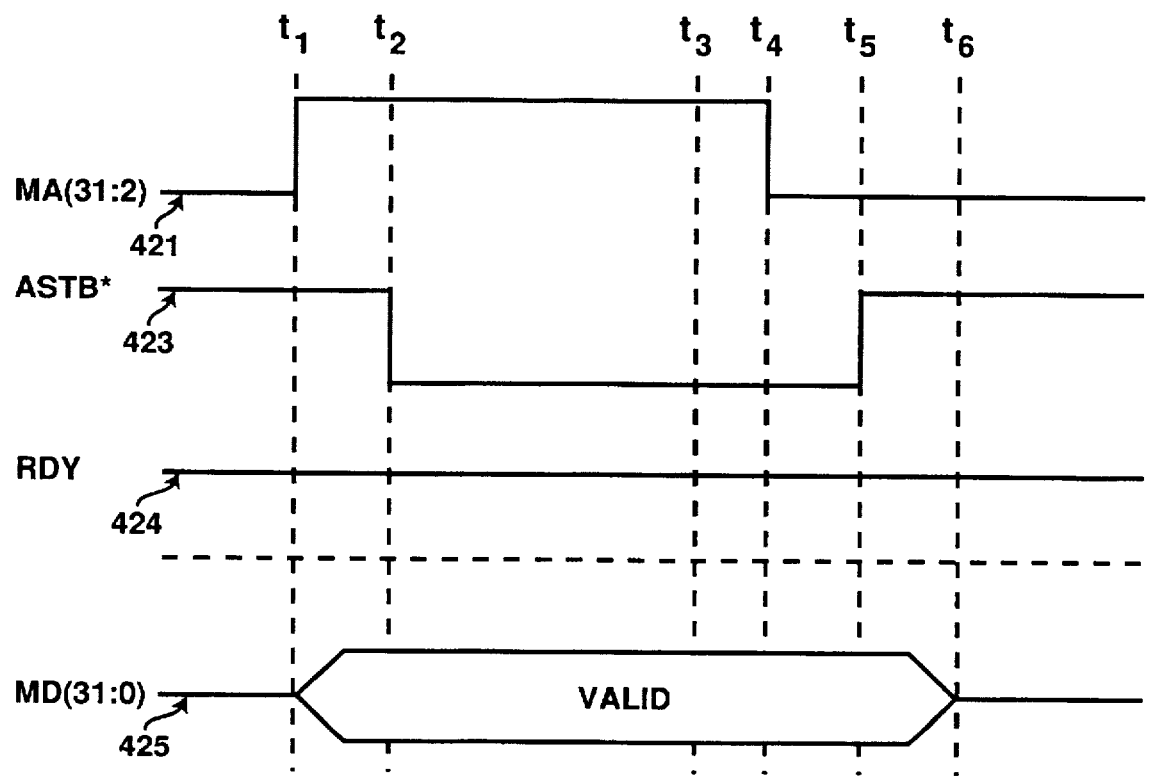
FIG. 4c is a timing diagram illustrating a deterministic write cycle.

Deterministic Write Cycle—FIG. 4c

Referring to FIG. 4c, the deterministic write cycle of the preferred embodiment is illustrated. At time $t_1$, the bus master which has been granted control of the bus drives an address onto the bus (MA(31:2) signal 421), and drives the data MD(31:0) 425 to be transferred onto the bus. The processor then asserts ASTB* signal 423 at time $t_2$.

Prior to the ASTB* signal 423 being asserted, address MA(31:2) signal 421 is decoded to determine the particular memory device having the selected memory address space location. In the preferred embodiment, the selection of a particular device is dependent on system memory address space assignments based on the memory size identification information provided by each of the memory modules to the decoder module at system power-up time.

After a deterministic access time of the system bus has been met, the processor deactivates ASTB* signal 423 at time $t_5$ and releases data signals 425 at time $t_6$. As described above, the deterministic access period is based on the characteristics of the memory device, these characteristics being supplied to the processor at the time the memory device replies with its response signals. RDY signal 424 remains active during the entire cycle. This completes the deterministic memory write cycle.

Figure 4D:
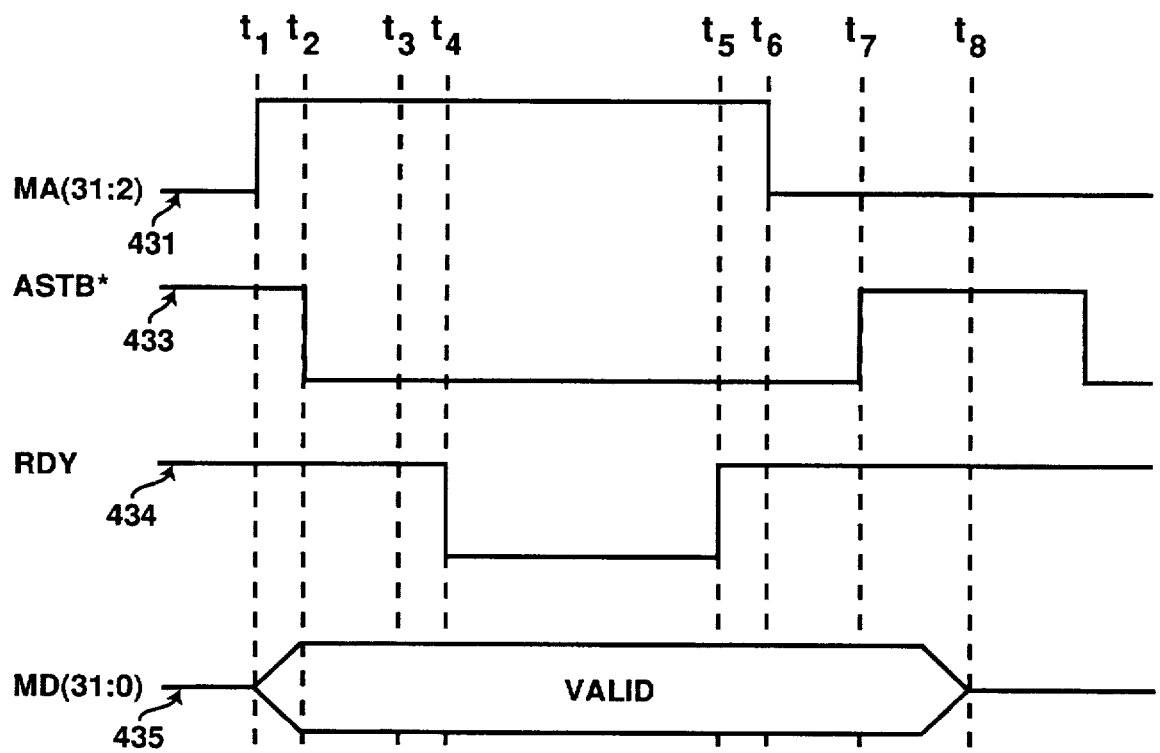
FIG. 4d is a timing diagram illustrating an asynchronous write cycle.

Asynchronous Write Cycle—FIG. 4d

Finally, referring to FIG. 4d, an asynchronous write cycle is illustrated. Again, the current bus master (processor granted access to the bus) drives address signals MA(31:2) 431 onto the bus, and asserts data MD(31:0) 435 onto the bus at time $t_1$. The ASTB* signal 433 is asserted at time $t_2$.

Responsive to assertion of the ASTB* signal 433, the address signal is decoded and the appropriate memory selected during time $t_2$ through $t_3$. If the selected device cannot respond to the write request in a deterministic time (i.e., this will be an asynchronous write), the selected memory inactivates the RDY signal 434 at time $t_4$. The information exchange is delayed during the period of time the RDY signal 434 is inactivated (time $t_4$ through $t_5$). When the selected memory device is ready to respond, the RDY signal 434 is again activated at time $t_5$.

Responsive to the RDY signal 434 being activated, the bus master releases the address signal lines 431 at time $t_6$ and inactivates the ASTB* signal 433 at time $t_7$.

The selected memory detects the ASTB* signal 433 being inactivated, releases the RDY signal 434 at time $t_8$. However, in the preferred embodiment, RDY signal 434 is held active by a pull-up resistor. The bus master then releases the data lines 435 at time $t_8$.

Figure 5:
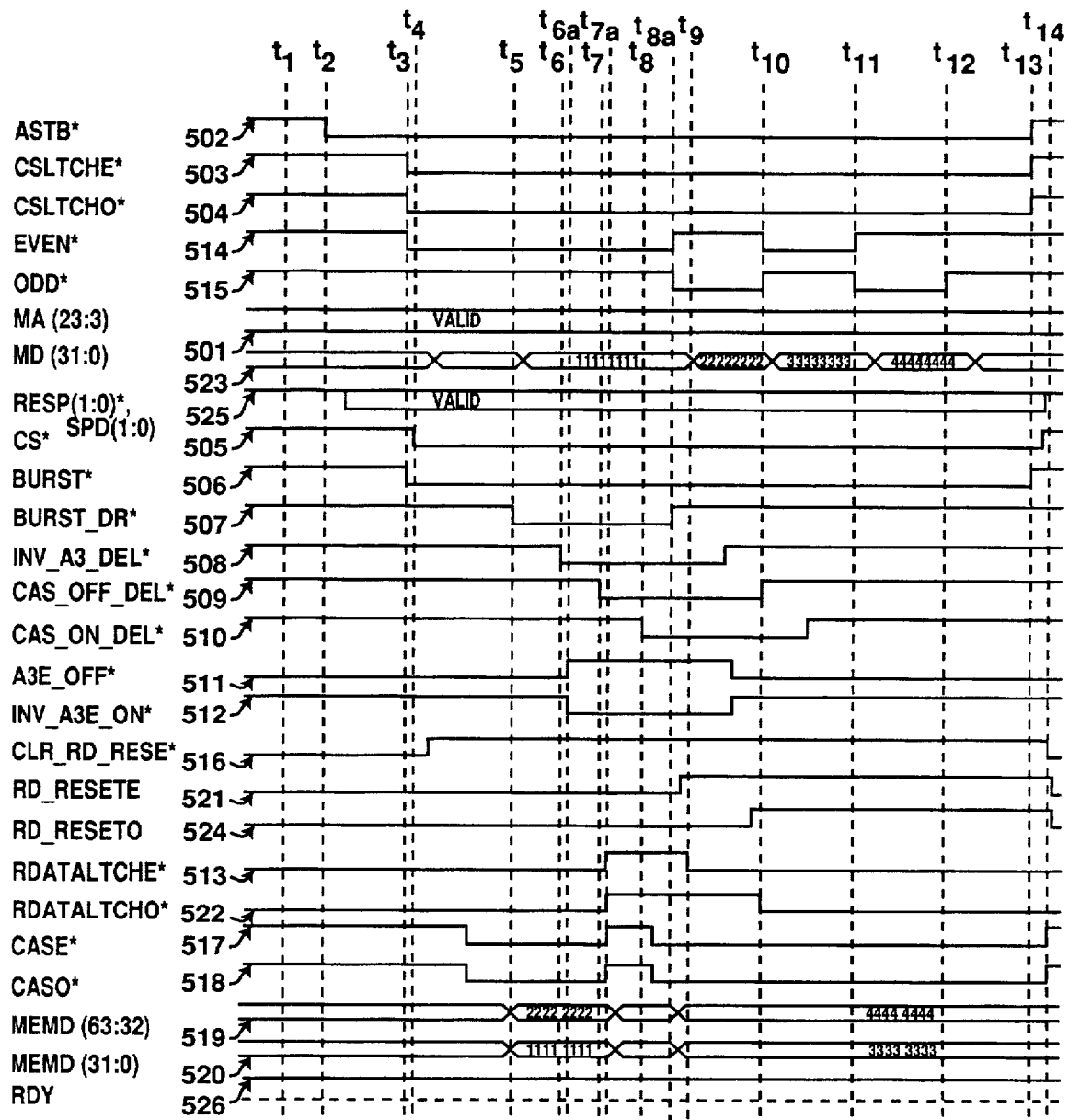
FIG. 5 shows a timing diagram of a burst read cycle used in the preferred embodiment.
Figures 1, 6D:
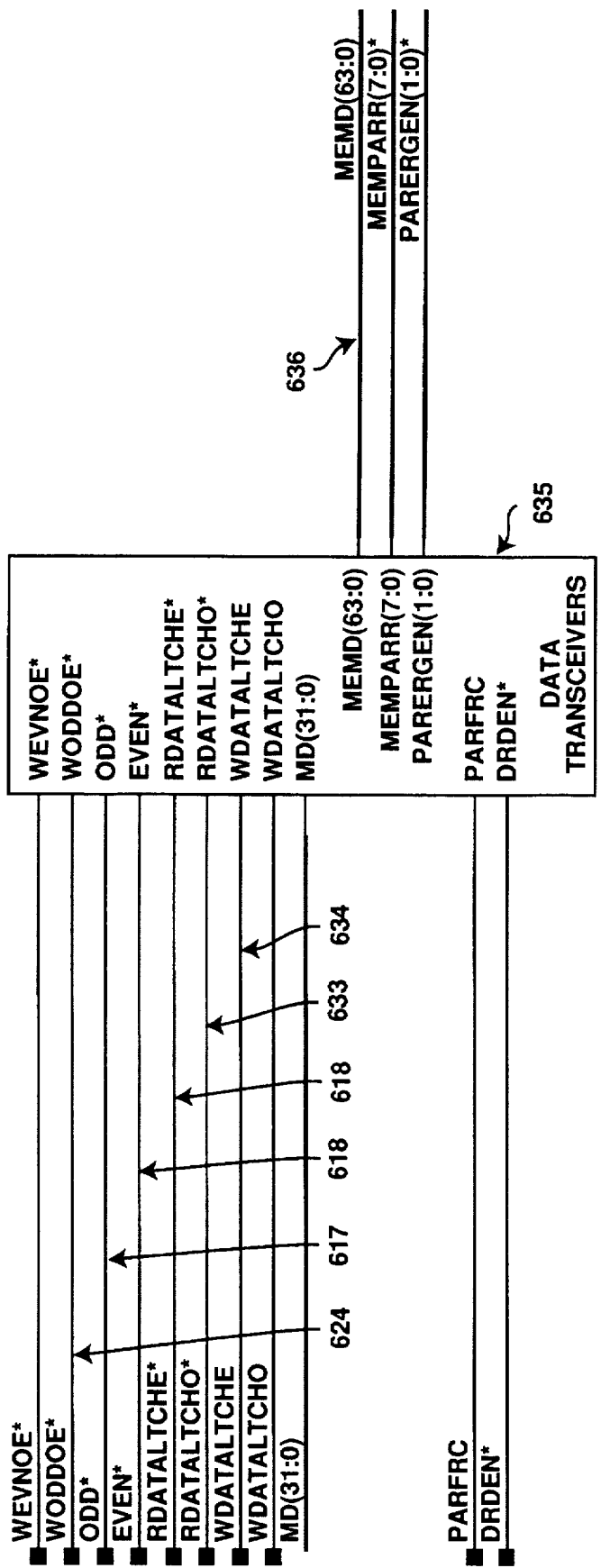
Figures 2, 6D:
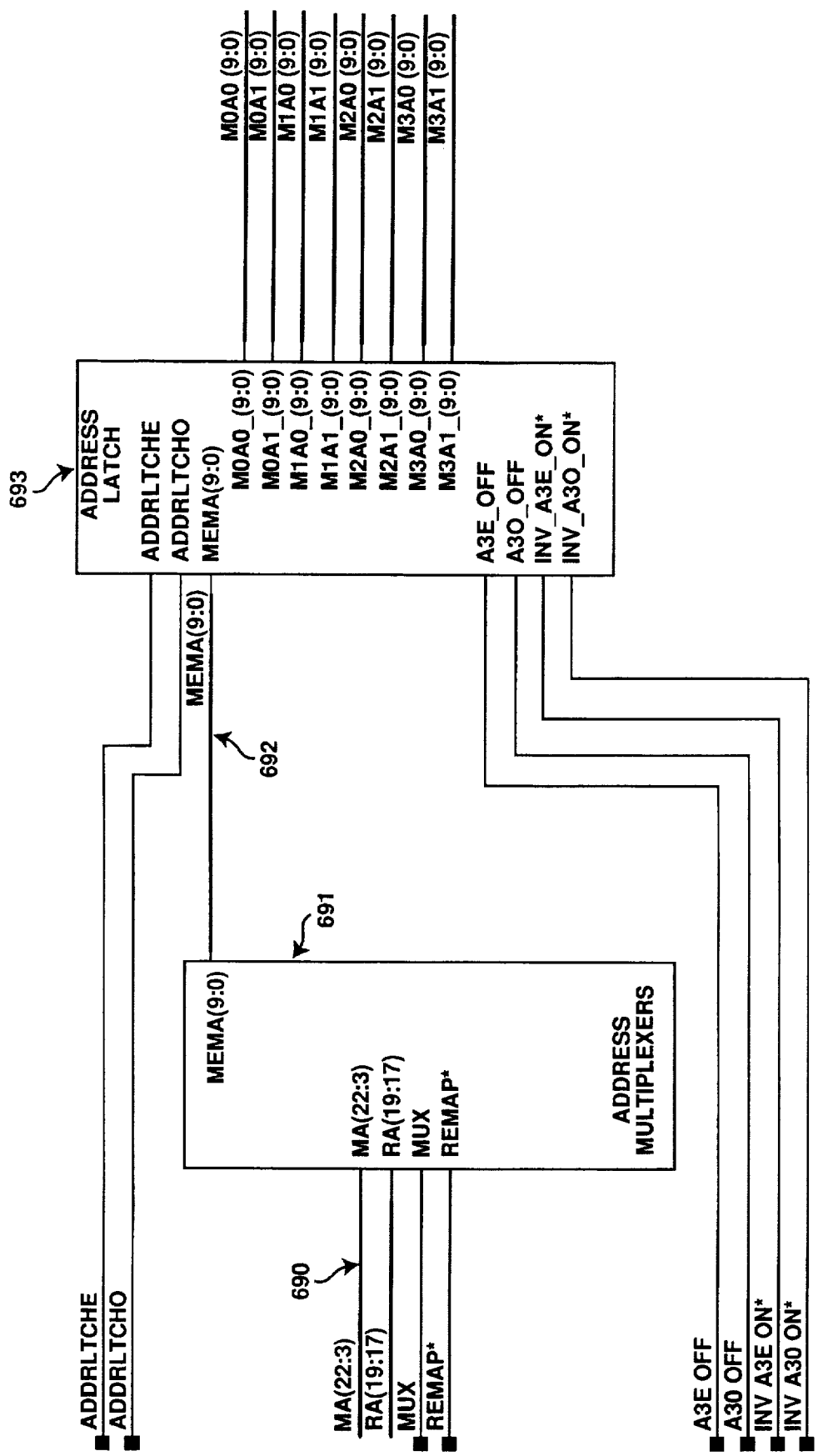

Burst Read Cycles—FIGS. 5 through 6d

The preferred embodiment also provides for certain accesses which transmits data on every clock cycle. This type of access is known as a "burst" read and it allows multiple DWORD's (32-bit words) to be transferred in consecutive clock cycles without driving address information on each DWORD access. For a code or an instruction fetch, four DWORD's (for a total of 128 bits) are provided on the bus once a burst mode is initiated. For a data fetch, either one, two, or four DWORD's (for a total of 32, 64, or 128 bits) are provided in a burst mode access. Burst mode accesses are provided in some microprocessors, including the 80486 microprocessor manufactured by Intel Corporation of Santa Clara, Calif. A detailed description of the burst mode provided by the 80486 microprocessor is discussed in the data book. "Microprocessors," published by Intel Corporation of Santa Clara, Calif. (1990), publication No. 230843-007 at pages 4–94 through 4–108. A detailed discussion or the circuitry required to perform a "burst" mode read offered by the preferred embodiment in conjunction with a microprocessor such as the 80486 is discussed with reference to FIGS. 5 through 6d.

As shown in FIG. 5, a burst read may be initiated by driving, at time $t_1$, in MA(31:2) 501 the starting address of the four DWORD transfer. FIG. 5 shows an asynchronous burst read operation starting on an even memory location boundary, however, it can be appreciated by one skilled in the art that the access may be deterministic (according to RDY signal 526) and may start on an odd location boundary wherein the EVEN* and ODD* signals 514 and 515 (and related signals) are changed. As shown in FIG. 6d, illustrating data transceivers used in the preferred embodiment, the MA(22:3) portion of the address is driven onto lines 690 which are coupled to address multiplexers 691 as shown in FIG. 6d. The remainder of the address MA(31:23) is decoded, the MA(1:0) are used for byte selection, and MA2 is used for indicating two 32-bit words that are accessed. Address multiplexers 691 feed into address latch 693 over lines 692. To initiate the burst read cycle, at time $t_2$, ASTB* 502 is driven active. CSLTCHE* 503 and CLSLTCHO* 504 are also simultaneous driven active to initiate the burst transfer. As shown in FIG. 6, ASTB* line 600 drives NAND gate 601 which is also coupled to input $V_{cc}$ coupled to a 4.7K ohm resistor 603. Delay line DASTB 604 is output from NAND gate 601 to generate all the memory timing relationships for RAS/CAS (Row Address Strobe and Column Address Strobe) generation. DASTB 604 is coupled to PAL 605 to generate signals at specific intervals for the various banks of memories. DASTB 604 is further coupled to PAL's 630 and 640 shown in FIGS. 6b and 6c for generating CAS signals for the even and odd memory locations, respectively. In this example, at time $t_3$, CSLTCHE* 503 and CSLTCHO* 504 are activated simultaneously in order to generate the CS* signal 505 which conditions column address strobe generation. Thereafter, at time $t_4$, the CS* signal 505 is activated in response.

To initiate the access, RESP(1:0)* and SPD(1:0)* signals 525 are valid as of time 53. This indicates the speed or transfer supported, as shown in Tables III and V. Also, as of time $t_3$, RDY signal 526 remains asserted by the memory interface to indicate the type of transfer (deterministic) being performed. At time $t_3$, BURST* signal 506 is asserted when STAT(2:0) signals indicate a burst is to occur (see Table VI). This causes BURST_DR* 507 to be activated at time $t_5$. BURST_DR* 507 is activated by BURST* line 606 shown in FIG. 6a at the activation of TAP_BURST line 609 60 nS after BURST* line 606 is activated which drives PAL's 610, 611, 612, and 613 as shown in RASGEN (RAS Generation) diagram 6a. These PAL's generate BURST_DR* signal 507 which is driven on line 615 to delay circuit 616 shown in FIG. 6a. Delay circuit 616 is shown in the timing diagram in FIG. 5 as generating INV_A3_DEL* 508 at time $t_6$, which inverts MA3 to the DRAM array for the second 64 bit access, a CAS_OFF_DEL* 509 which inactivates CASE* 517 and CASO* 518 at time $t_{7a}$ and CAS_ON_DEL* 510 which reactivates column address strobe at time $t_8$. These signals provide timing information to CASGEN PAL's 620 and 630 shown in FIGS. 6b and 6c to activate control signals at appropriate times. CAS_OFF_DEL* line 617 and CAS_ON_DEL* line 618 are output from delay circuit 616 30 nS and 45 nS after the BURST_DR* signal 507 is received over line 615 from each PAL 610 through 613. BURST_DR* line 615 also activates a 15 nS delay signal A3_DEL_DR over line 619 which is coupled to OR gate 621. INV_A3_DEL* 508 is generated over line 624 also at time $t_5$ as shown in the timing diagram in FIG. 5. OR gate 621 provides a gate delay only, and does not modify the signal received over line 619. INV_A3_DEL* 508 activates A3E_OFF 511 and INV_A3E_ON* 512 at time $t_{6a}$. These are generated by line 624 shown in FIGS. 6b and 6c which drive into PAL's 620 and 630 to activate lines 626 and 625 shown in FIG. 6b and 625a and 626a in FIG. 6c.

A3E_OFF 511 and INV_A3E_ON* 512 shown in FIG. 5 switch the MA3 address signal contained in 501 to the memory before the second 64-bit read access for the remainder of the four DWORD burst. CAS_OFF_DEL* 509 and CAS_ON_DEL* 510 control the column address strobe lines output from PAL's 620 and 630 shown in FIGS. 6b and 6c to generate column address strobe signals for even and odd column memory locations. The signals in 617 and 618 drive PAL's 620 and 630 causing signals to be generated over lines CASE* 626 in FIG. 6b and CASO* 627 shown in FIG. 6c. These lines are input to a series of OR gates 628 in FIG. 6b for even column memory location and OR gates 629 in FIG. 6c for odd column memory location CAS signal generation over lines 631 and 632.

At time $t_{7a}$, RDATALTCHE* 513 and RDATALTCHO* 522 are driven inactive, by CAS_OFF_DEL* 509 being activated by delay circuit 616 shown in FIG. 6a. This latches the data from the memory for the first 64 bit access into the data transceivers 635 shown in FIG. 6d while the second 64 bit access is in process. Data transceiver latches 635 will be cleared by the inactivation of EVEN* 514, for RDATALTCHE* 513 activation, or ODD* 515 for RDATALTCHO* 522 activation. This relationship of the latch control to EVEN* 514 and ODD* 515 is necessary to ensure that the data remains valid until the requestor can access it. Note that once RDATALTCHE* 513 and RDATALTCHO* 522 have been reactivated, latch 635 will stay in flow-through or transparent mode until the end of the cycle.

As is shown in FIG. 6d, ODD* line 637 and EVEN* line 638 are coupled to 635 for latching data over lines 636. The activating of EVEN* signal 514 and ODD* signal 515 allows the first DWORD (32 bits) to be transferred into data transceivers 635. Then the second DWORD containing odd data is transferred into data transceivers 635. Data is read from the memory latch by the CPU module on the rising edge of the EVEN* signal 514. It was necessary to latch the data because the second 64 bit read has already started. At this point, the first 64 bits of the 128 burst mode transfer has completed and the second 64 bits needs to be accessed.

In order to read the third and fourth DWORDS of the 128-bit transfer, it is necessary to reset the latching function of transceivers 635. To do this, RDATALTCHE 513 and RDATALTCHO* 522 are deactivated, thereby resetting the latching function of data transceivers 635. At time $t_{8a}$, when EVEN* signal 514 is activated, the third DWORD is enabled from data transceivers 635. This is shown as signals MEMD(31:0) 520. The rising edge of the EVEN* signal at time $t_{8a}$ causes RDATALTCHE* signal 513 to be deactivated. RDATALTCHE* signal 513 is cleared by the CASGEN PAL'S 620 and 630 as a result of CLR_RD_RESE* 516 signal at time $t_9$ to make the data transceiver 635 transparent. CLR_RD_RESE* signal 516 is generated by NOR gates (640 and 642 in FIGS. 6b and 6c which are driven over line 643 into flip-flops 644 and 646. These generate the RD_RESETE signals 521 over lines 645 and RD_RESETO signal 524 over line 647 shown in FIGS. 6b and 6c for the odd and even banks of memory, respectively. This causes the RDATALTCHE* and RDATALTCHO* signals 513 and 522 over lines 633 and 634 to be reset at time $t_9$ and $t_{10}$, respectively. Data transceivers 635 will allow data to flow through to be read by the processor module prior to or simultaneously with the falling edge of the EVEN* signal 514 at time $t_{10}$ in the same manner as discussed above. The same signal sequence repeats for the odd side of the memory. After the second DWORD is read, RDATALTCHO* 522 is activated on the rising edge of ODD* signal 515 at time $t_{10}$. Then, the ODD* signal 515 is activated a second time at time $t_{11}$ enabling the fourth DWORD on the bus. The fourth DWORD is read by the processor module prior to or simultaneously with the rising edge of ODD* signal 515 at time $t_{12}$. Thus, a four DWORD transfer has been completed on the bus. The read cycle ends when CSLTCHE* 503 and CSLTCHO* 504 and/or ASTB* 502 is deactivated at time $t_{13}$ as shown in FIG. 5. At time $t_{14}$, the signals are returned to their states before the burst transfer shown in FIG. 5.

Data read from the SIMM memories is indicated as MEMD(63:32) 519, and MEMD(31:0) 520. The data can be seen on the bus during a burst read cycle as 1111 1111, 2222 2222, 3333 3333, and 4444 44444 as shown in MD(31:0) signal 523. Thus, a full 128-bit transfer has been completed as of time $t_{13}$ shown in FIG. 5. Fewer than the full four DWORD 128 bit react may be performed, in the same manner as discussed above, by the CPU module asserting ASTB* 502 or CSLTCHE* 503 and CSLTCHO* 504 inactive in order to terminate the transfer. Therefore, one, two or four DWORD's may be transferred. It can be appreciated that the burst read cycle is a substantial improvement over the standard read cycle which requires driving addresses and the memory responding on alternating clock cycles. The burst read of the preferred embodiment allows data to be put on the bus on every clock cycle for a total possible transfer of 128 bits (a four DWORD "burst") in one request. This substantially increases bus throughput and thus overall system execution.

Cache Consistency Protocol—FIGS. 7 through 12

CPU module(s) may support two-level caching hierarchies in the preferred embodiment. There may be a primary cache, which is the first resource level where the CPU(s) will attempt to access data. In some embodiments the primary cache resides in the CPU itself. Also, a secondary cache may be present, which typically stores a greater volume of information than the primary cache. Each processor module in the preferred embodiment has caches associated with them such as 103 in FIG. 1a, or 153 and 163 as shown in FIG. 1b. The cache(s) may be used with either a write-through or a write-back cache replacement algorithms. A write-through cache replacement algorithm is one in which, on CPU write cycles to a cache location, the write to memory is also broadcast to the bus in order to update the memory as well as the cache contents. Cache contents therefore always remain consistent with memory. A write-back cache replacement algorithm is one which only updates the cache during a CPU write cycle. Memory is updated later with the information placed in the cache or "written back" when the cache contents are to replaced (by a read or write miss) or when a request is made for the data from another bus master. A read or write miss to the cache causes data to be invalidated if the cache is full, using the cache tag. In some embodiments, write-backs take place at predetermined intervals such as during CPU idle times, or when discrete circuitry within the system detects that the cache is full and should be written to main memory.

Data consistency between the cache(s) and system memory in the asynchronous architecture of the preferred embodiment is maintained during accesses to memory by means of a "snoop" protocol. A "snoop" is a process wherein the cache controller checks the address of an access outstanding on the interface to determine if the access is to a memory location that is currently in the cache. Related to the snoop is the "snarf" which is used when an agent which made the original read request captures the data which is currently being written back from the cache.

It is a requirement of the preferred embodiment that the secondary cache be a superset of the primary cache. In other words, all the valid data within the primary cache is also included within the secondary cache. This is known as the "inclusion principle." This technique is provided to optimize CPU/cache concurrent operations while a standard bus master owns the memory bus interface. If a secondary cache is a superset of the primary cache, then the only time that an invalidation of the primary cache is necessary is when a "snoop" generates a secondary cache hit. By contrast, if the secondary cache is not a superset of the primary cache, then every snoop generated by the bus must be broadcast to the primary cache.

Table VII lists the cache states used in the preferred embodiment between the primary and secondary caches. Note that the condition that both caches being either on or off is allowed by the preferred embodiment. The condition of the primary cache being "off" and the secondary cache "on" is valid in the preferred embodiment. The condition of the secondary cache being "off" and the primary cache being "on" is not allowed by the preferred embodiment as it violates the inclusion principle.

TABLE VII

| PRIMARY CACHE STATE | SECONDARY CACHE STATE | ALLOWED? |
|---|---|---|
| "OFF" | "OFF" | YES |
| "OFF" | "ON" | YES |
| "ON" | "OFF" | NO* |
| "ON" | "ON" | YES |

*This condition violates the Inclusion Principle between the Primary and Secondary caches.

Snoop Cycles

The use of "snoop" cycles for the bus of the preferred embodiment will now be discussed. These "snoop" cycles allow the processor(s) of the preferred embodiment to maintain consistency between data maintained in the cache(s) and main memory, during alternate or secondary bus master accesses. A secondary master is defined as the current owner of the interface whose access initiates a cache "snoop cycle" on a processor subsystem that is not currently accessing the interface. The architecture of the preferred embodiment supports two types of "snoop" cycles: (1) asynchronous; and (2) deterministic. Deterministic snoop cycles are used for cache(s) that can perform a TAG lookup and invalidation, if necessary, within a defined time period of 120 nS in the preferred embodiment. Asynchronous snoop cycles are used for cache(s) that are not guaranteed to complete a TAG lookup and invalidation in 120 nS, and/or if applicable, a write-back cycle of modified data is required.

Deterministic Snoop Cycles

Deterministic snoop cycles are used by resources in the preferred embodiment which have the following attributes:

1. those that use a write-through cache replacement protocol only; and
2. those which can always perform a TAG lookup and invalidation cycle within 120 nS.

Those resources that do not meet these criteria must support the asynchronous snoop protocol which is discussed in more detail below. A CPU module will indicate its type of snoop cycle support during CPU module configuration time. This is discussed in more detail with reference to FIG. 7.

Figure 7:
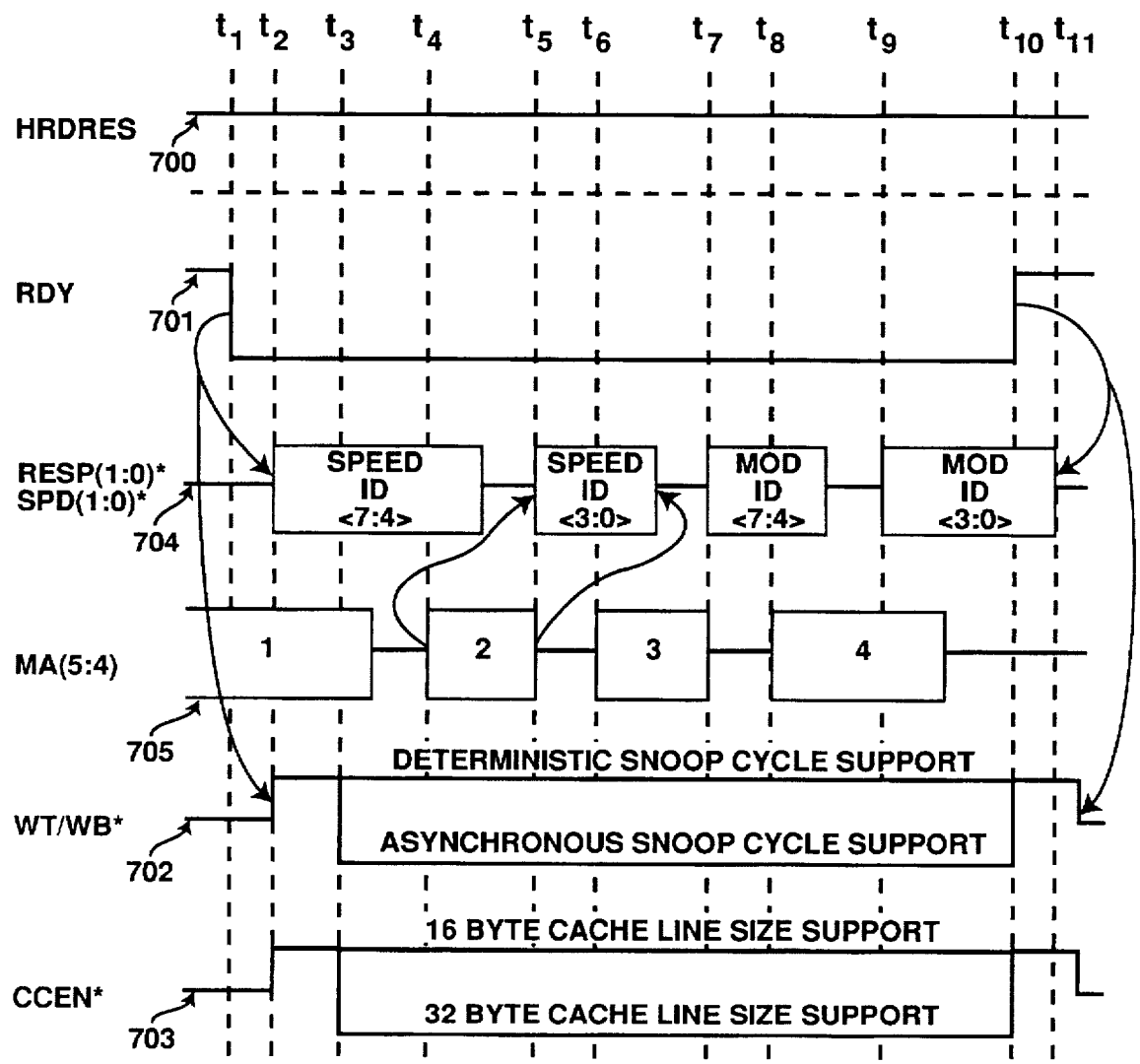
FIG. 7 shows a timing diagram of a CPU module configuration cycle used in the preferred embodiment.

As shown in FIG. 7, a CPU module configuration or reset cycle is executed while the signal HRDRES 700 is active. This process may be performed during time $t_6$ as shown in FIG. 2. The configuration sequencer within the decode logic circuitry of the preferred embodiment, will inactivate RDY signal 701 at time $t_1$ to indicate that the module will start driving configuration information onto the bus. At time $t_2$, the WT/WB* 702 and the CCEN* 703 signals are activated. The memory bus interface logic captures this information and it is subsequently used to determine whether asynchronous or deterministic snoop cycles are supported. In addition, at time $t_2$, CPU module attribute information is driven through response signal 704. The upper four bits (RESP(1:0)*, SPD(1:0)* (see Table V)) of the response signal are used to drive attribute information of the central processing unit module at time $t_2$.

At time $t_3$, the WT/WB* signal 702 is driven active for asynchronous cycle support, and is left inactive for deterministic snoop cycle support. In addition, CCEN* signal 703 is left inactive for 16-byte cache line size support, and is driven low for 32-byte cache line size support.

At time $t_4$, MA(5:4) signals 705 are driven to prompt the CPU configuration module for the remainder of the speed information. This information is returned at time $t_5$ using response signal 704.

At time $t_6$, module ID information is requested by MA(5:4) signals 705 which information is then returned at time $t_7$ in signal 704. At time $t_8$, the remainder of module ID information is requested by the MA(5:4) signal 705. The remainder of the module ID information is returned in signal 704 at time $t_9$. At time $t_{10}$, RDY signal 701 is driven active and in response, WT/WB* 702, CCEN* signal 703, and signals 704 are returned to their previous states. CPU module configuration is complete. Once configuration is complete, the information provided by the CPU module is retained in memory bus 120 for communication. Once configuration of the CPU module has been accomplished using this process, cache consistency may be maintained using either deterministic or asynchronous snoop cycles, as indicated by the configuration information returned in WT/WB* signal 702 as shown in FIG. 7. These two types of snoop cycles will now be discussed.

Figure 8:
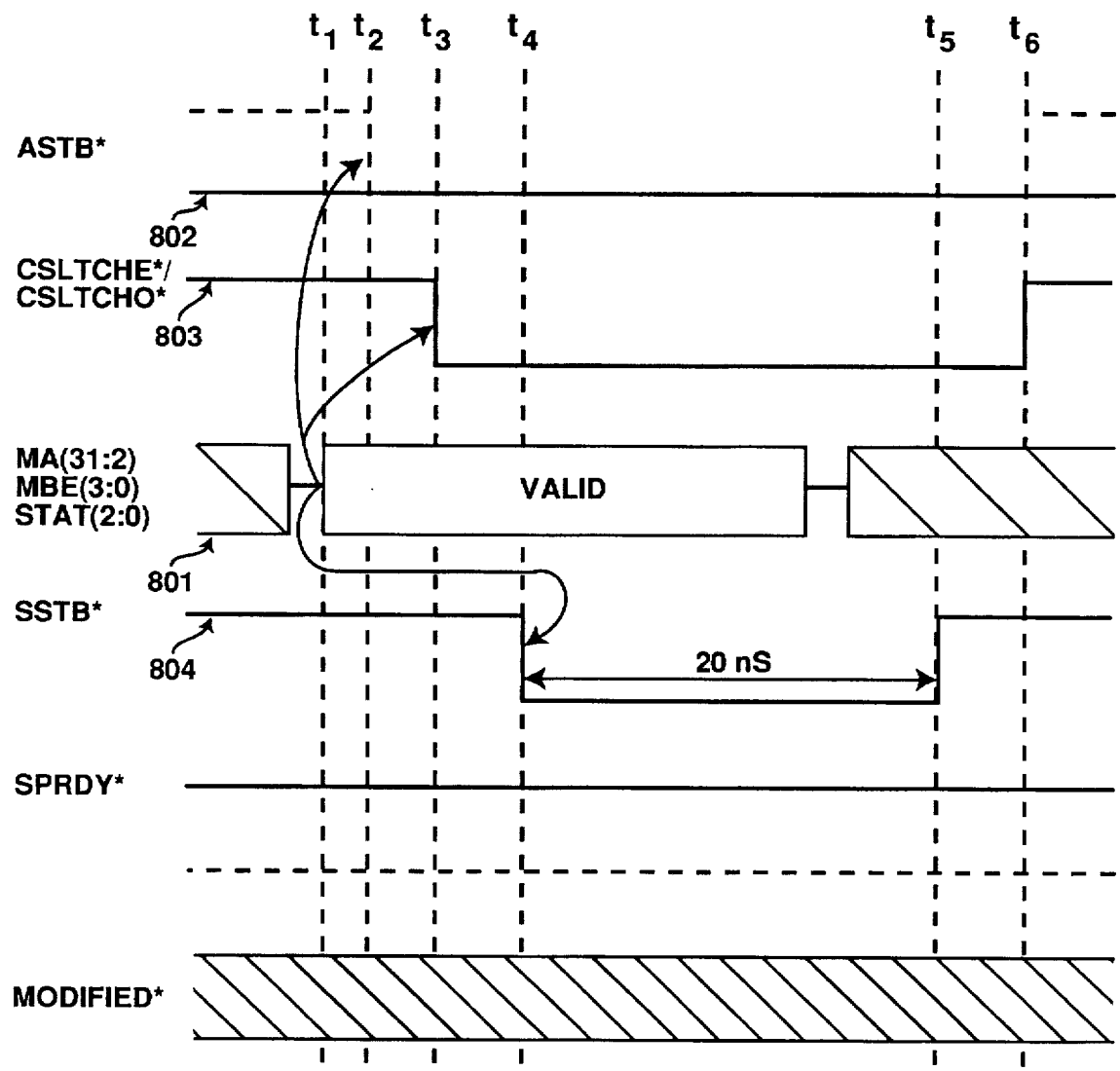
FIG. 8 shows a timing diagram for a deterministic snoop cycle used in the preferred embodiment.

FIG. 8 illustrates a deterministic snoop cycle used in the preferred embodiment. As is shown in FIG. 8, a deterministic snoop cycle will start by driving a valid address at time $t_1$ on the address, status, and byte enable signals 801 (MA(31:2), MBE(3:0), and STAT(2:0)). If ASTB* signal 802 is currently high, it is driven low at time $t_2$. In addition, if the CSLTCHE/O* signals 803 are inactive, they are activated at time $t_3$. In response to valid address, status, and byte enable information 801 being placed on the bus, the current bus master or the bus interface drives the SSTB* (snoop strobe) signal 804 active at time $t_4$ to indicate that valid snoop addresses are available. The CPU module can then begin a TAG lookup cycle. The SSTB* signal 804 continues to be driven active by the bus master or the bus interface for a minimum pulse width of 20 nS between times $t_4$ and $t_5$, to allow the CPU module to begin a TAG lookup cycle (discussed below). The standard bus interface must maintain the activation of SSTB* 804 for a minimum pulse width of 20 nS to ensure that it is sensed by the CPU module. Between times $t_4$ and $t_5$, for 20 nS, there must be no multiple edge transitions. No other interaction is required between the bus interface and the CPU module until the next activation of SSTB* 804. After SSTB* signal 804 is returned to its inactive state at time $t_5$, CSLTCHE/O* signals 803 and ASTB* 802 are returned to their previous states, upon meeting all timings on the memory bus interface, before the start of the deterministic snoop cycle shown in FIG. 8. The CPU module TAG lookup cycle, which will be performed as initiated by SSTB* 804 signal as initiated at time $t_4$. The advantage of the deterministic snoop cycle is that transfer rates from an I/O master are allowed to occur at approximately 33 megabytes per second (the maximum EISA burst transfer rate). During a snoop, the CPU module will perform a check to see if the address of the transfer on the interface matches a stored address within the TAG. If it does, then the current contents of that memory location reside in the TAG and they must be operated upon to remain consistent. If the operation was a write cycle, then the data in the cache must be invalidated.

Asynchronous Snoop Cycles

Asynchronous snoop cycles are used for CPU modules that cannot support deterministic snoops depending on configuration information returned at reset time shown in FIG. 7. There are two types of asynchronous snoop cycles supported by the preferred embodiment: (1) invalidation-only type snoop cycles; and (2) invalidation with write-back snoop cycles. Invalidation-only type snoop cycles are used when the snoop results in a cache miss or a cache hit to a non-modified cache line. The invalidation with write-back snoop cycle requires that the CPU write-back a modified cache line (that was a cache hit from the snoop cycle) before the standard bus interface cycle completes.

Figure 9:
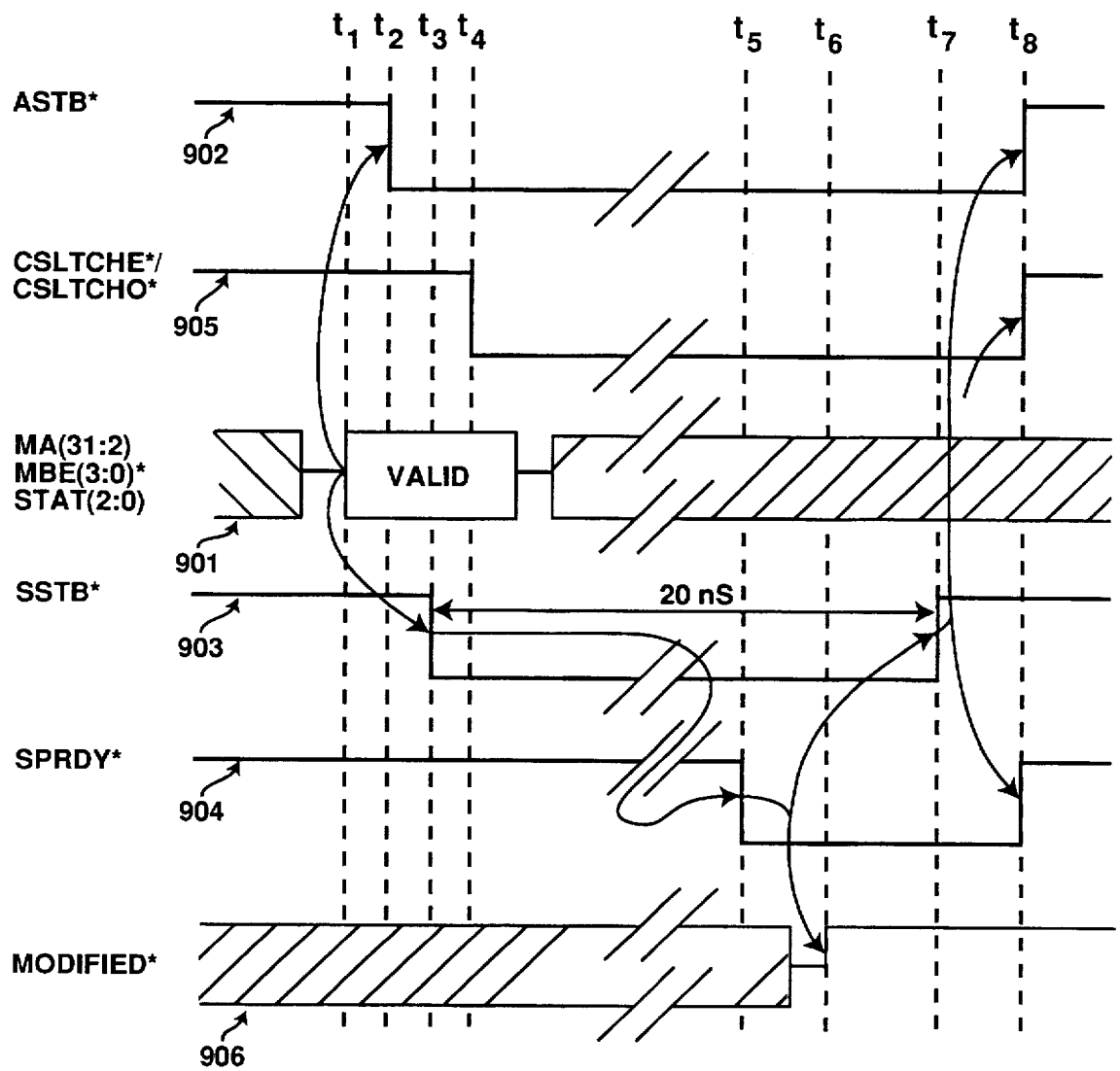
FIG. 9 shows a timing diagram of an asynchronous snoop cycle to a non-modified line or a cache miss.

An invalidation-only cycle is shown in FIG. 9. An invalidation cycle is one in which either a "hit" occurred to a non-modified cache line (cache contents are consistent with memory) or a cache line miss (the requested data was not in the cache). At time $t_1$, valid address information is present on the bus via signals MA(31:2), MBE(3:0)*, and STAT(2:0) 901. As in the case of a typical read or write operation, ASTB* 902 is driven active at time $t_2$. At time $t_3$, the bus interface or the current bus master activates the snoop strobe signal 903 to indicate that a snoop cycle has been requested. At time $t_4$, CSLTCHE/O* signals 905 are driven active.

In contrast to the deterministic snoop cycle shown in FIG. 8, the standard bus interface will suspend the current cycle until the high to low sampling of SPRDY* signal 904. This occurs at time $t_5$. Once SPRDY* 904 is driven low at time $t_5$ in FIG. 9, the results of the snoop, as indicated by MODIFIED* signal 906, are now available at time $t_6$. If MODIFIED* 906 is inactive, the snoop cycle resulted in a cache miss or a hit to a non-modified cache line which indicates that, at most, an invalidation of the cache line was performed. When MODIFIED* 906 is sensed inactive at time $t_6$, the cycle may continue. SSTB* 903, which has been active since time $t_3$, can be driven inactive at time $t_7$. After time $t_7$, SPRDY* 904 can be driven inactive by the CPU module within a defined time. SSTB* 903 must be active for a certain minimum activation pulse width of 20 nS such as between times $t_3$ and $t_7$ and meet the defined signal relationships, as shown in FIG. 9. It must also not be driven active until SPRDY* 904 is driven inactive from a previous snoop cycle. The invalidation-only cycle is complete when, at time $t_8$ as shown in FIG. 9, SPRDY* 904, CSLTCHE/O* 905, and ASTB* 902 are all driven inactive at time $t_8$.

Figure 10:
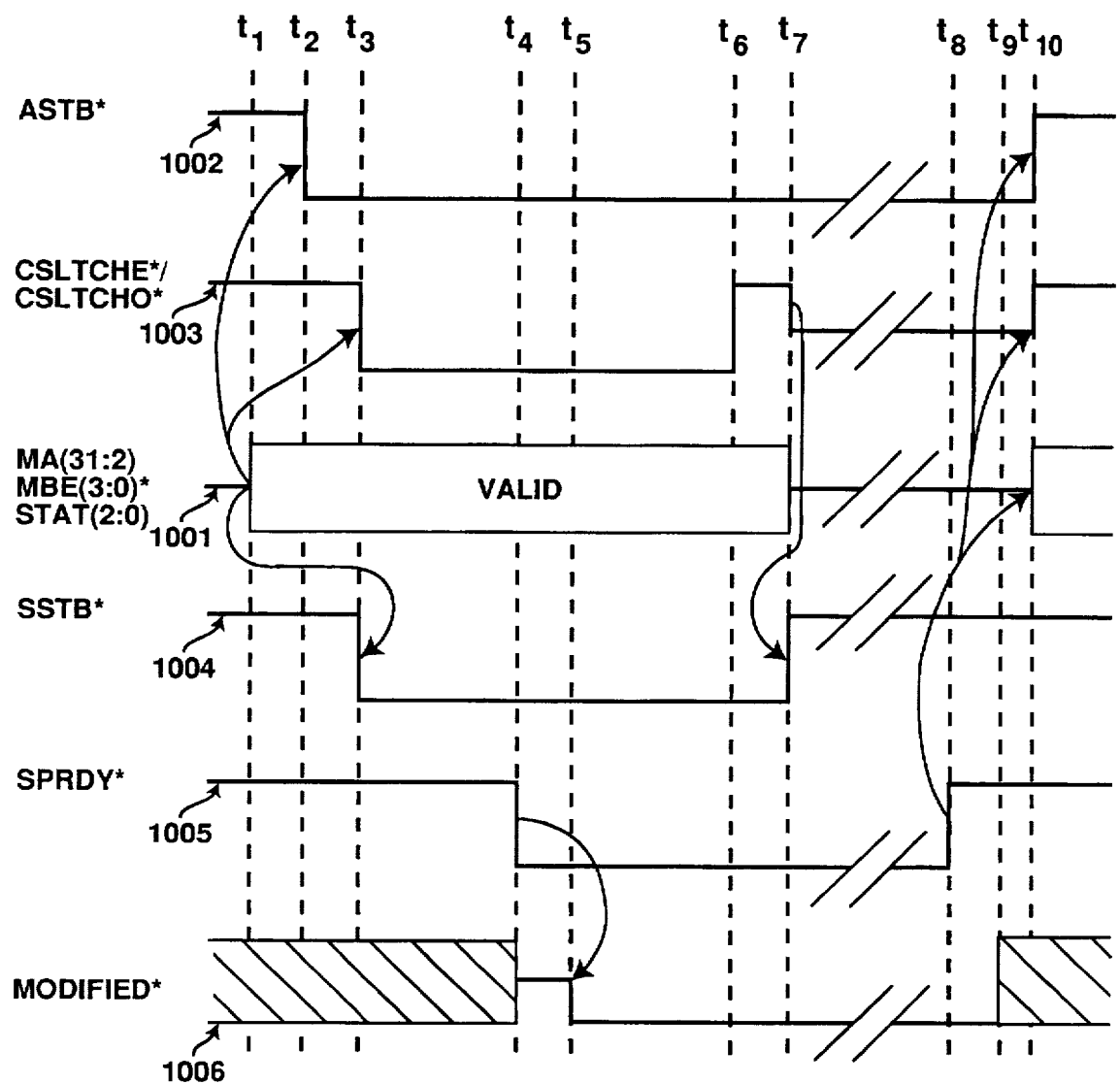
FIG. 10 shows a timing diagram of an invalidation cycle requiring write-back as used in the preferred embodiment.

Asynchronous snoop cycles requiring write-backs from the cache are discussed with reference to FIG. 10. This process is used when a hit to a modified cache line occurs (cache contents are not consistent with memory). As discussed previously, valid address, status, and byte enable signals 1001 are driven valid at time $t_1$. The cycle starts at time $t_2$ wherein the ASTB* signal 1002 is activated and the CSLTCHE/O* signals 1003 are driven active at time $t_3$. In addition, at time $t_3$, SSTB* 1004 is activated at time $t_3$ by the standard bus interface. This indicates to the CPU module that valid address and status information is present on the interface. As discussed with reference to FIG. 9, the standard bus interface will suspend the current cycle until sampling SPRDY* (snoop ready) signal 1005 active, which indicates that the results of the CPU module snoop cycle are now available. MODIFIED* signal 1006 returns the results of the snoop operation. SPRDY* signal 1005 is driven active at time $t_4$ by the CPU module, and MODIFIED* 1006 will reflect the results of the snoop at time $t_5$ as shown in FIG. 10. If a write-back is required by the central processing module, the CPU module will return MODIFIED* 1006 active at time $t_5$. If a write-back is not required, the CPU module returns MODIFIED* 1006 inactive, which is shown in FIG. 9. In the event that a write-back cycle is required, the standard bus interface will continue to drive ASTB* 1002 active but CSLTCHE/O* signals 1003 are driven inactive at time $t_6$. The status address and byte enable and data lines 1001 are floated at time $t_6$ as well, thus to transfer control to the CPU module to perform the write-back. The write-back cycle is discussed in more detail with reference to FIG. 11. Once these actions have occurred, the standard bus interface will inactivate SSTB* 1004 at time $t_7$, indicating to the CPU module that it should perform the write-back from the cache. The write-back will now be discussed with reference to FIG. 11.

Figure 11:
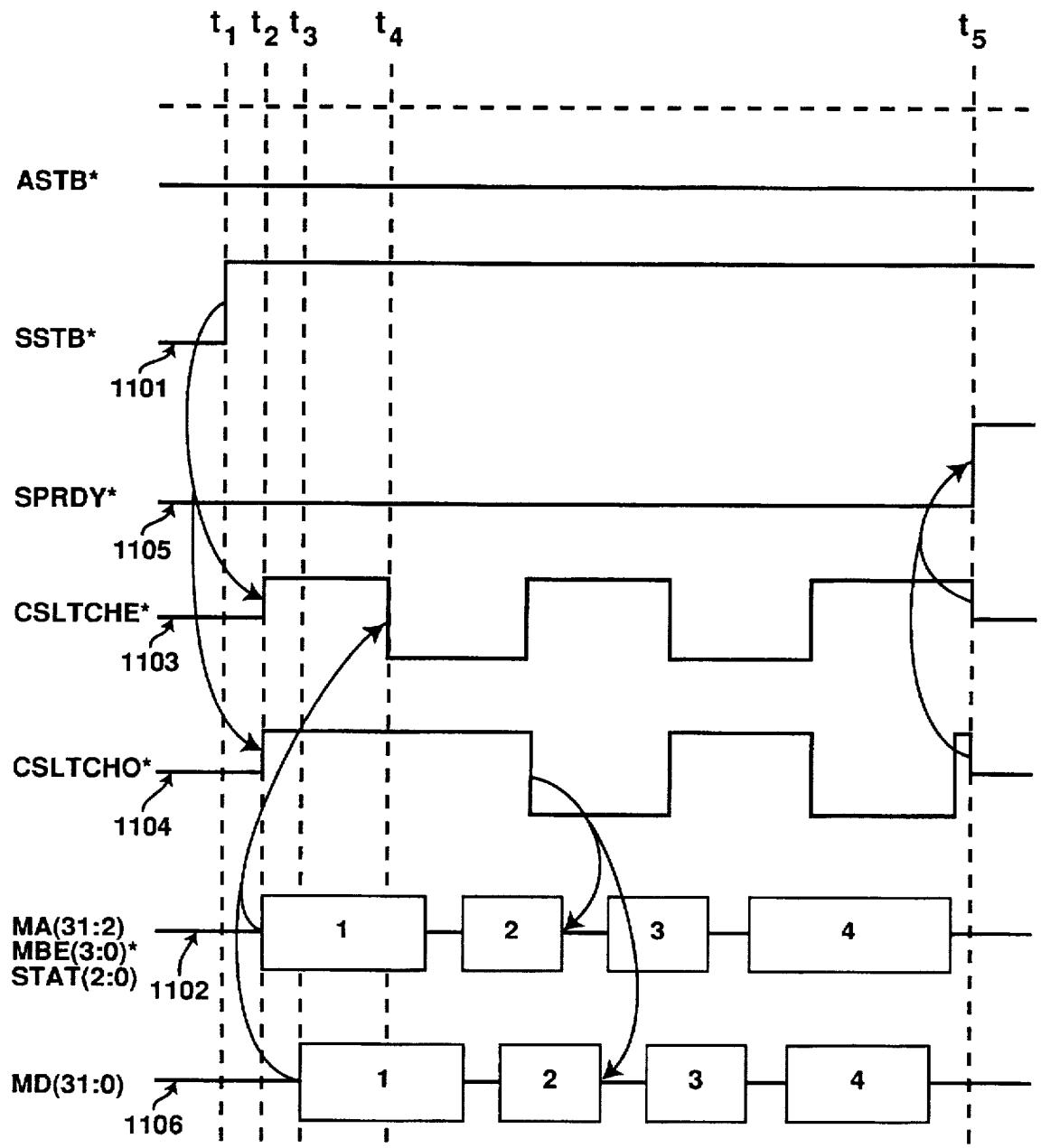
FIG. 11 shows a CPU module write-back cycle.

As is shown in FIG. 11, at time $t_1$, which corresponds with time $t_7$ in the bus arbitration timing diagram shown in FIG. 10, SSTB* 1101 has been driven inactive by the standard bus interface. At time $t_2$ shown in FIG. 11, the CPU module then drives address, status, and byte enable information signals 1102 at time $t_2$. Also at time $t_2$, the CPU module drives CSLTCHE* 1103 and CSLTHCHO* 1104 inactive at time $t_2$ until such time as MD(31:0) signals 1165 are valid. Valid data is driven as MD(31:0) signals 1106 at time $t_3$, and then CSLTCHE* 1103 is activated at time $t_4$. CSLTCHE* 1103 and CSLTCHO* 1104 are alternated along with the corresponding data lot the duration of the cache line writeback, until the write-back cycle is complete. The completion of the write-back is indicated at time $t_5$ indicated on FIG. 11 when the CPU module drives SPRDY* 1105 inactive at time $t_5$. Then, control is returned to the standard bus interface and the snoop with write-back cycle completes as shown in FIG. 10.

The driving of SPRDY* signal 1005 shown in FIG. 10 is detected at time $t_8$ as shown in FIG. 10. At time $t_{10}$, ASTB* signal 1002 and CSLTCHE/O* signals 1003 are returned to their original state prior to the snoop cycle shown in FIG. 10. The snoop cycle, with the write-back, is thus completed at time $t_{10}$.

The asynchronous nature of the bus means that during the snoop cycle, some event must occur that indicates that the snoop has completed. This event is asynchronous to any clock. However, it is generated slightly before the information containing the snoop results. By allowing this signal relationship to occur, the overhead of synchronizing the completion indication signal is hidden by the fact that it has to be synchronized to be recognized. This synchronization occurs while the results of the snoop are still being determined. Therefore, no penalty is incurred for the asynchronous interface, even during a snoop operation.

An additional feature provided by the preferred embodiment is that the standard bus interface for read requests which initiated the write-back cycle monitors the write-back cycle as indicated in FIG. 11. This is done to see whether any data which is being written to memory by the CPU module can be captured for this operation, which has been suspended by the write-back operation. If there is a match between memory being written to main memory as indicated by MD(31:0) signals 1105 and data being requested on the bus, then the data is "snarfed" during the write-back to main memory.

Maintaining Cache Consistency

In order to maintain consistency between data which resides in the cache(s) and data contained in main memory, the snoop cycles generated by a standard bus master and/or CPU modules, must be performed at regular intervals. For CPU modules implementing a write-through cache replacement algorithm, snoop cycles are only required on write accesses by standard bus masters to memory. For this type of cache structure, cache data is always consistent with memory. Therefore, any time memory is written to, the data contents of the cache location are invalidated. Read accesses require no cache action at all. However, to ensure that only a limited performance penalty is incurred for snoop cycles on writes to write-through caches, it is strongly recommended that there be no concurrent operation in a multilevel caching environment between the CPU and the secondary cache.

Figure 12:
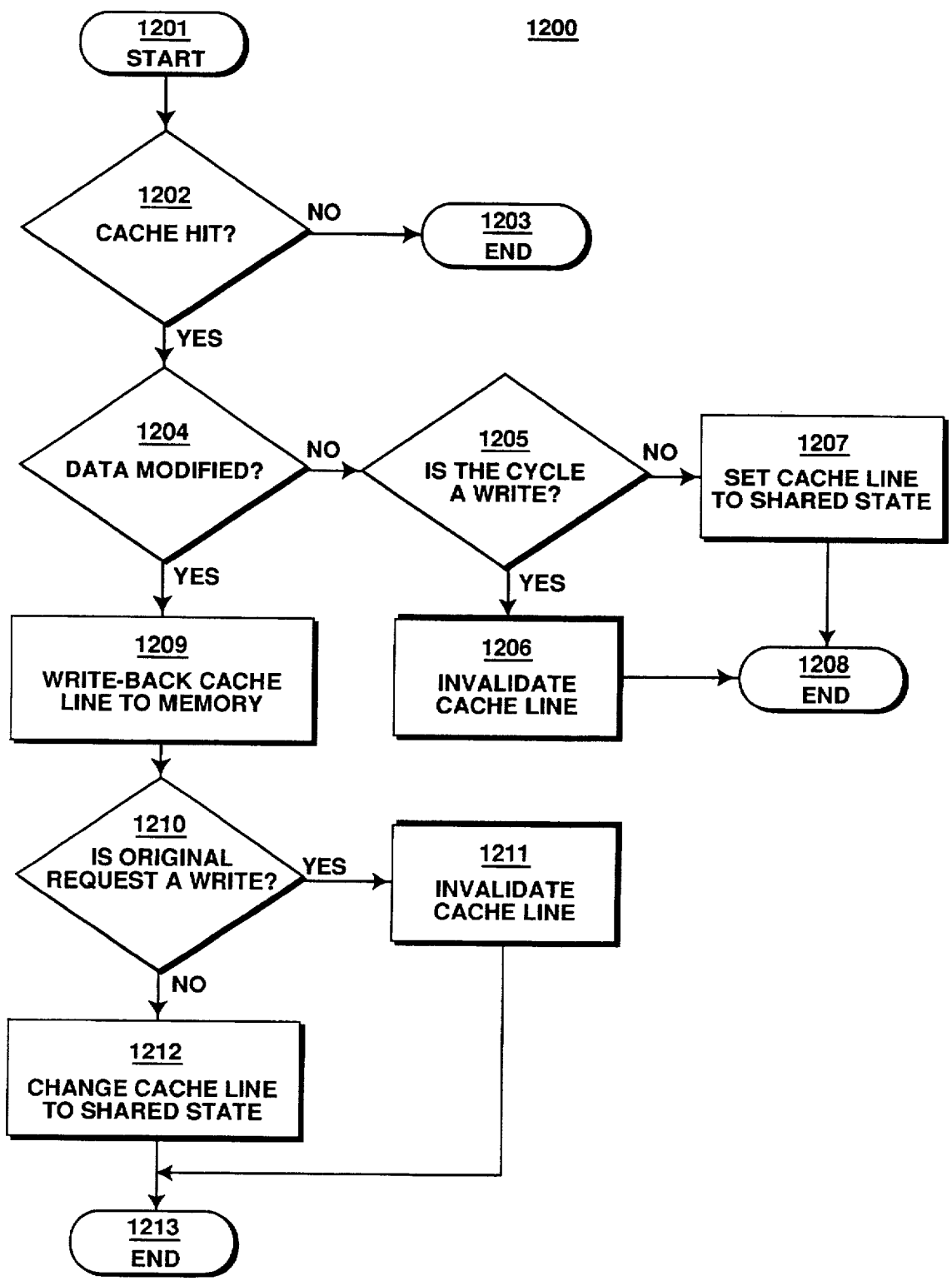
FIG. 12 shows the cache consistency method as used by the preferred embodiment.

For CPU modules implementing write-back cache replacement algorithms, the process similar to that shown in FIG. 12 must be used in order to maintain consistency of the cache during read and write operations. Snoop cycles are therefore performed upon both read and write cycles from standard bus master to memory. Using a snoop, 1200 determines at step 1202 if the element is in the cache. If the item is not in the cache, then no further action is necessary and process 1200 ends at 1203. The read or the write operation may then take place as necessary by filling the cache with valid data, or writing data into the cache for later write-back. If, however, there was a cache hit as determined at step 1202, process 1200 proceeds to step 1204 wherein it is determined via a cache tag table lookup by the CPU module, to determine whether the area of memory has been modified. For instance, a cache tag such as 104 shown in FIG. 1a may be accessed. This is determined at step 1204. If the data has not been modified, then it is determined whether the cycle is a write at step 1205. If it is, then process 1200 proceeds to invalidate the cache entry at step 1206 and end at step 1208. If the cycle is a read, then the data is indicated as being in a "shared" state (i.e. required by more than one CPU module) at step 1207, and process 1200 ends at step 1208.

If the data has been modified as determined at step 1204 by the CPU module cache tag lookup, then process 1200 proceeds to step 1209 wherein the cache line will be written back to memory. Then, it is determined whether the request generating the tag lookup was a write cycle at step 1210. If so, then the cache line is invalidated at step 1211. If not, then the cache line is changed to a "shared" state via the cache tag at step 1212. Cache consistency process 1200 then ends at step 1213 once either of these actions has taken place.

Thus, an invention for burst mode transfers between memory and a processor in a computer system has been described. Although the present invention has been described particularly with reference to FIGS. 1a through 12, it will be apparent to one skilled in the art the the present invention has utility far exceeding that disclosed in the figures. It is contemplated that many changes and modifications may be made, by one of ordinary skill in the art, without departing from the spirit and scope of the invention, as disclosed above.

What is claimed is:

1. An asynchronous computer bus maintaining consistency of data contained in a cache and a memory which are each coupled to the bus, the bus comprising:
    a. cache snoop indication means used by a requester coupled to the bus for requesting a cache lookup to determine whether requested data from said memory resides in said cache;
    b. cache hit indication means for indicating the presence of said requested data in said cache;
    c. write access indication means for indicating that said request to access said requested data by said requester is a write access;
    d. modified cache data indication means for indicating the modification of said requested data in said cache;
    e. invalidation means coupled to said cache hit indication means, said write access indication means and said modified cache data indication means for invalidating said requested data in said cache, the invalidation means invalidating said requested data in said cache responsive to said cache hit indication means indicating the presence of said requested data in said cache, said modified data indication means indicating the modification of said requested data in said cache and said write access indication means indicating that said request to access said requested data is a write access;
    f. write-back means coupled to said invalidation means for writing back the requested data in said cache data to said memory, the write-back means activated responsive to the invalidation means invalidating said requested data in said cache;
    g. shared data indication means for indicating that said requested portion of said cache is requested by a second requester, said shared data indication means being activated responsive to said cache hit indication means indicating the presence of said requested data in said cache and upon said write access indication means indicating that said access is not a write operation of said requested data in said cache; and
    h. cache snoop indication means for indicating to said requester that the results of said cache lookup in said cache are available wherein the cache hit indication means supports either deterministic snoops of the requested data contained in said cache or asynchronous snoops of the requested data contained in said cache.

2. The apparatus of claim 1 wherein said cache hit indication means comprises:
    a. deterministic snoop cycle circuitry for performing deterministic snoops of said requested data contained in said cache within a first period of time; or b. asynchronous snoop cycle circuitry for performing asynchronous snoops of said requested data contained in said cache, said asynchronous snoop circuitry including completion signal activation means for indicating to a requester that the result of said asynchronous snoop is available.

3. The apparatus of claim 2 wherein said first period of time comprises 120 nS.

4. The apparatus of claim 2 further comprising identification circuitry for use by each requester coupled to said bus, said identification circuitry for identifying whether each said requester comprises said deterministic snoop cycle circuitry or said asynchronous snoop cycle circuitry.

5. The apparatus of claim 4 wherein said apparatus further comprises configuration means for requesting that each said requester coupled to said bus identify whether each said requester comprises said deterministic snoop cycle circuitry or said asynchronous snoop cycle circuitry using said identification circuitry.

6. The apparatus of claim 1 wherein said cache and said requester are each separate modules coupled to the bus.

7. The apparatus of claim 1 further comprising write-back interception circuitry coupled to said write-back means comprising:

a. write-back monitoring circuitry determining whether said requested data being written back by said write-back means is requested to be read by a third requester; and b. write-back sampling circuitry for obtaining said requested data from said write-back means responsive to said write-back monitoring circuitry determining that said requested data being written back by said write-back means is requested to be read by said third requester, and for providing said requested data to said third requester.

8. A computer system including a processor module, a cache, a main memory and a cache consistency circuit comprising:

a. asynchronous snoop support indication circuit retaining a cache consistency mode which said processor module indicates it is capable of supporting during a configuration cycle, wherein said support indication circuit for said processor module indicates that said processor module is capable of supporting deterministic snoop cycles or asynchronous snoop cycles;

b. memory access address lines carrying a first address of an access to said main memory to lookup in said cache;

c. a snoop cycle indication line wherein said snoop cycle indication line comprises a first state driven by a bus requester, said first state indicating that said processor module should perform a cache lookup;

d. a snoop result ready line operative when said asynchronous snoop support indication circuit indicates that said processor module is capable of supporting asynchronous snoop cycles, said snoop result ready line having a second state driven by said processor module an arbitrary period of time after said first state of said snoop cycle indication line, wherein said second state of said snoop indication line indicates that a result of said cache lookup is available; and e. a write-back indication line for indicating that said processor module must perform a write-back of said memory location at said first address.

9. The system of claim 8 wherein said bus requester and said cache are each separate modules coupled to the bus.

10. The system of claim 8 further comprising a second processor module which supports deterministic snoop cycles or asynchronous snoop cycles.

11. A computer system comprising:

a bus which supports both asynchronous snoop cycles and deterministic snoop cycles;

a main memory coupled to said bus;

a cache memory coupled to said bus which performs deterministic snoops or asynchronous snoops;

a bus requester coupled to said bus which drives requests onto said bus indicating that said cache memory should perform a cache lookup; and said cache memory indicating the presence of requested data to said bus requester within a first period of time after receiving said request indicating to perform a cache lookup, provided said cache memory performs deterministic snoops, said cache memory indicating the presence of said requested data to said bus requester by issuing a completion signal to said bus requester after determining whether said requested data is contained in said cache memory, provided said cache memory performs asynchronous snoops.

* * * * *